(12) United States Patent
Mantchala et al.

(10) Patent No.: US 6,907,081 B2
(45) Date of Patent: Jun. 14, 2005

(54) MPEG ENCODER CONTROL PROTOCOL FOR ON-LINE ENCODING AND MPEG DATA STORAGE

(75) Inventors: Raymond Mantchala, boncourt (FR);
John Forecast, Newton, MA (US);
Peter Bixby, Westborough, MA (US);
Sorin Faibish, Newton, MA (US);
Michel Noury, Villebon sur Yette (FR);
Wayne W. Duso, Shrewsbury, MA (US)

(73) Assignee: EMC Corporation, Hopkinton, MA (US)

(*) Notice: Subject to any disclaimer, the term of this patent is extended or adjusted under 35 U.S.C. 154(b) by 935 days.

(21) Appl. No.: 09/823,024

(22) Filed: Mar. 30, 2001

(65) Prior Publication Data

US 2002/0172281 A1 Nov. 21, 2002

(51) Int. Cl.[7] .......................... H04N 7/12; H04N 11/02; H04N 11/04
(52) U.S. Cl. ............. 375/240.26; 348/700; 375/240.28; 385/52
(58) Field of Search ...................... 375/240.26, 240.28; 348/478, 700; 386/52, 65, 55

(56) References Cited

U.S. PATENT DOCUMENTS

| | | | |
|---|---|---|---|
| 5,231,484 A | 7/1993 | Gonzales et al. | 358/133 |
| 5,381,144 A | 1/1995 | Wilson et al. | 341/63 |
| 5,534,944 A | 7/1996 | Egawa et al. | 348/584 |
| 5,565,998 A | 10/1996 | Coombs et al. | 386/46 |
| 5,675,384 A | 10/1997 | Ramamurthy et al. | 348/405 |
| 5,694,170 A | 12/1997 | Tiwari et al. | 348/390 |
| 5,793,897 A | 8/1998 | Jo et al. | 382/246 |
| 5,838,678 A | 11/1998 | Davis et al. | 370/389 |
| 5,859,660 A | 1/1999 | Perkins et al. | 348/9 |
| 5,892,915 A | 4/1999 | Duso et al. | 395/200.49 |
| 5,959,690 A | 9/1999 | Toebes, VIII et al. | 348/578 |
| 5,969,650 A | 10/1999 | Wilson | 341/67 |
| 6,134,378 A * | 10/2000 | Abe et al. | 386/52 |
| 6,160,587 A * | 12/2000 | Walker et al. | 348/478 |
| 2001/0013123 A1 * | 8/2001 | Freeman et al. | 725/34 |
| 2002/0129374 A1 * | 9/2002 | Freeman et al. | 725/91 |

OTHER PUBLICATIONS

Y. Nakajima, H. Hori, and T. Kanoh, "Rate Conversion MPEG Coded Video by Requantization Process," IEEE Proc. of ICIP–95, vol. III, Sep. 1995, pp. 408–411.

A.T. Erdem and M.I. Sezan, "Multi–generation Characteristics of the MPEG Video Compression Standards," IEEE Proc. of ICIP–94, vol. II, 1994, pp. 933–937.

M. Perreira, and A. Lippman, "Re–codable video," IEEE Proc. of ICIP–94, vol. II, 1994, Pp. 952–956.

M. Mohsenian, R. Rajagopalan, and C.A. Gonzales, "Single–pass constant– and variable–bit–rate MPEG–2 video compression," IBM J. Res. Develop., vol. 43, No. 4, Jul. 1999, pp. 489–509.

P. H. Westerink, R. Rajagopalan, and C.A. Gonzales, "Two–pass MPEG–2 variable–bit–rate encoding," IBM J. Res. Develop., vol. 43, No. 4, Jul. 1999, pp. 471–488.

(Continued)

*Primary Examiner*—Chris Kelly
*Assistant Examiner*—Charles Parsons
(74) *Attorney, Agent, or Firm*—Novak, Druce & Quigg, LLP; Richard Auchterlonie

(57) ABSTRACT

Coded video from an on-line MPEG video encoder is stored as a clip in a video server or is otherwise received in the video server and prepared or used for splicing. In order to reduce apparent frame inaccuracy that may result from the splicing process, the on-line MPEG video encoder and the server are coordinated so that the group-of-picture (GOP) structure in the encoder provides specified In-points and Out-points that are valid and desirable for splicing. An encoder control protocol is also provided for remote control of the on-line MPEG video encoder in order to coordinate the on-line MPEG video encoder with the video server.

51 Claims, 26 Drawing Sheets

OTHER PUBLICATIONS

Jill Boyce, John Henderson, and Larry Pearlstein, "An SDTV Decoder with HDTV Capatibility: An All–Format ATV Decoder," Hitachi America, Ltd., file:C:Fatima\67.gif, pp. 67–75, published at least as early as Jan. 12, 2000.

Boon–Lock Yeo, "On fast microscopic browsing of MPEG–compressed video," IBM T.J. Watson Research Center, Jan. 1988, Multimedia Systems 7, 1999, pp. 269–281.

Robert Mokry and Dimitris Anastassiou, "Minimal Error Drift in Frequency Scalability for Motion–Compensated DCT Coding," IEEE Transactions on Circuits and Systems for Video Technology, vol. 4, No. 4, Aug. 1994, pp. 392–406.

C. Ward, C. Pecota, X. Lee, and G. Hughes, "Seamless Splicing for MPEG–2 Transport Stream Video Servers," SMPTE Journal, Dec. 1999, pp. 873–879.

Norm Hurst and Katie Cornog, "MPEG Splicing: A New Standard for Television—SMPTE 312M," SMPTE Journal, Nov. 1998, pp. 978–988.

Norm Hurst and Katie Cornog, "Splicing FAQ," http://www.mpeg.org/MPEG/splicing–FAW.html, 8 pages, published at least as early as Oct. 13, 1999.

SMPTE 312M–1999, SMPTE Standard for Television, "Splice Points for MPEG–2 Transport Streams," Approved Apr. 8, 1999, The Society of Motion Picture and Television Engineers, White Plains, NY, 20 pages.

"The Shape of MPEG," DV Magazine, vol. 4, No. 12, Dec. 1996, http://livedv.com/Mag/Dec96/Contents/mpeg.html, 5 pages, published at least as early as Oct. 13, 1999.

"A Guide to MPEG Fundamentals and Protocol Analysis (Including DVB and ATSC," Tektronix, Inc., Beaverton, Oregon, 1997, pp. 48 pages.

Leonardo Chiariglione, "MPEG and multimedia communications," CSELT, Torino, Italy, http://www.cselt.stet.it/ufv/leonardo/paper/isce96.htm, 50 pages, published at least as early as Oct. 13, 1999.

Barry G. Haskell, Atul Puri, and Arun N. Netravali, *MPEG–2 Video Coding and Compression,* Chp. 8, pp. 156–182, and "Interactive Television," Chp. 13, pp. 292–306, Digital Video: An Introduction to MPEG–2, Chapman & Hall, New York, NY, 1997.

"MPEG–2: The basics of how it works," Hewlett Packard, published at least as early as Oct. 31, 1999, 17 pages.

Anil K. Jain, *Fundamentals of Digital Image Processing,* Prentice Hall, Inc., Englewood Cliffs, New Jersey, 1989, Chapter 4: Image Sampling and Quantization and Chapter 5: Image Transforms, pp. 80–188.

"Information technology—Generic coding of moving pictures and associated audio information: Systems," International Standard, ISO/IEC 13818–1:1996(E), 136 pages.

"Information Technology—Generic coding of moving pictures and associated audio information: Video," International Standard, ISO/IEC 13818–2:1996(E), 211 pages.

"Information technology—Generic coding of moving pictures and associated audio information—Part 3: Audio," International Standard, ISO/IEC 13818–3:1995(E), 118 pages.

Jerry D. Gibson, Toby Berger, Tom Lookabaugh, Dave Lindbergh, and Richard L. Baker, *Digital Compression for Multimedia: Principles and Standards,* Morgan Kaufmann Publishers, Inc., San Francisco, CA, 1998, Chapter 9: JPEG Still–Image Compression Standard, pp. 291–308, and Chapter 11: MPEG Compression, pp. 363–417.

Barry G. Haskell, Atul Puri, and Arun N. Netravali, Digital Video: An Introduction to MPEG–2, Chapman & Hall, New York, NY, 1997, pp. 1–279, 292–306, 369–421.

Nilesh V. Patel and Ishwar K. Sethi, *Compressed Video Processing For Cut Detection,* Vision and Neural Networks Laboratory, Dept. of Computer Science, Wayne State University, Detroit, MI, Oct. 1997, 26 pages.

Nilesh V. Patel and Ishwar K. Sethi, *Video Shot Detection and Characterization for Video Databases,* Vision and Neural Networks Laboratory, Dept. of Computer Science, Wayne State University, Detroit, MI, Oct. 1997, 22 pages.

Bo Shen, Ishwar K. Sethi and Vasudev Bhaskaran, *DCT Convolution and Its Application In Compressed Video Editing,* Dept. of Computer Science, Wayne State University, Detroit, MI and Visual Computing Dept., Hewlett–Packard Laboratories, Palo Alto, CA, To appear in *SPIE VCDIP '97,* also submitted to *IEEE Trans. Cir. And Sys. For Video Tech.,* 11 pages.

B. Shen and I.K. Sethi, *Convolution–Based Edge Detection for Image/Video in Block DCT Domain,* Vision & Neural Networks Laboratory, Dept. of Computer Science, Wayne State University, Detroit, MI, To appear in *Journal of Visual Communications and Image Representation,* 19 pages.

Bo Shen and Ishwar K. Sethi, *Direct feature extraction from compresses images,* Vision and Neural Networks Laboratory, Dept. of Computer Science, Wayne State University, Detroit, MI, *SPIE vol. 2670, Storage & Retrieval for Image and Video Databases IV, 1996,* 12 pages.

Bo Shen and Ishwar K. Sethi, *Block–Based Manipulations On Transform–Compressed Images and Videos,* Vision and Neural Networks Laboratory, Dept. of Computer Science, Wayne State University, Detroit, MI, To appear in *Multimedia Systems,* 26 pages.

Bo Shen and Ishwar K. Sethi, *Inner–Block Operations On Compressed Images,* Vision and Neural Networks Laboratory, Dept. of Computer Science, Wayne State University, Detroit, MI, *ACM Multimedia '95,* San Francisco, CA, Nov. 5–9, 1995, 10 pages.

Alexandros Eleftheriadis and Dimitris Anastassiou, *Constrained and General Dynamic Rate Shaping of Compressed Digital Video,* Dept. of Electrical Engineering and Center for Telecommunications Research, Columbia University, New York, NY, *Proceedings, $2^{nd}$ IEEE International Conference on Image Processing (ICIP–95),* Arlington, VA, Oct. 1995, 4 pages.

Alexandros Eleftheriadis and Dimitris Anastassiou, *Optimal Data Partitioning of MPEG–2 Coded Video,* Dept of Electrical Engineering and Center for Telecommunications Research, Columbia University, New York, NY, *Proceedings, $1^{st}$ International Conference on Image Processing (ICIP–94),* Austin, Texas, Nov. 1994, 5 pages.

Andrew B. Watson, Joshua A. Solomon, Albert Ahumada, and Alan Gale, *DCT Basis Function Visibility: Effects of Viewing Distance and Contrast Masking,* (1994), 11 pages, in B.E. Rogowitz (Ed.), Human Vision, Visual Processing and Digital Display IV (pp. 99–108), Billington, WA, SPIE.

O'Reilly Network Broadcast 2000 Brings DV Editing to Linus (Aug. 11, 2000), http://www.oreillynet.com/pub/a/network/2000/08/11/magazine/broadcase 2000.html, published at least as early as Mar. 27, 2001, 3 pages; Broadcast 2000, http://heroinewarrier.com/bcast2000.php3, published at least as early as Mar. 27, 2001, 4 pages.

MPEG Wizard: MPEG Real–Time External Encoder, http://www.duplexx.com/mpgwiz.html, MPEG Wizard: MPEG Real–Time Encoder —Features and Software, http://www.duplexx.com/mpgwiz_f.html, WPEG Wizard: MPEG Real–Time Encoder—Specs & Requirements, http://www.duplexx.com/mpgwiz_r.html, published at least as early as Mar. 19, 2001, 4 pages.

Optivision MPEG–1 Encoder, http://brahma.imag.fr/Multimedia/jeudis/jeudi2/Optivision_mpeg1enc.html, published at least as early as Mar. 19, 2001, 3 pages.

Adrienne Electronics Corporation—Home Page, http://www.adrielec.com/, 1 page; Functional Grouping of LTC/VITC, VTR Interface, and Video Products, http://www.adrielec.com/listing.htm, 2 pages; Adrienne Electronics Products and Price Listings Catalog, http://www.adrielec.com/shortfor.htm, 8 pages; AEC–BOX–8/18/28 Standalone VITC and/or LTC Time Code Generator, http://www.adrielec.com/box28lit.htm, 4 pages; AEC–BOX–8/18/28 Standalone LTC/VITC Time Code Reader, http://www.adrielec.com/box20lit.htm, 5 pages, published at least as early as Mar. 15, 2001.

National P/N CLC020—SMPTE 259M Digital Video Serializer with Integrated Cable Driver, http://www.national.com/pf/CL/CLC020.html, published at least as early as Mar. 14, 2001, 3 pages.

TE600 MPEG–2 DSNG Encoder, satellite uplink equipment, downlink, teleports, earth stations, amplifiers, antennas, http://www.usacanada.net/satellite/te600.htm, published at least as early as Mar. 14, 2001, 2 pages.

TDR600/RA, satellite uplink equipment, downlink, teleports, earth stations, amplifiers, antennas, http://www.usacanada.net/satellite/tdr600–ra.htm, published at least as early as Mar. 14, 2001, 2 pages.

TE300A MPEG–2 Encoder, satellite uplink equipment, downlink, teleports, earth stations, amplifiers, antennas, http://www.usacanada.net/satellite/te300a.htm, published at least as early as Mar. 14, 2001, 3 pages.

TE–30, satellite uplink equipment, downlink, teleports, earth stations, amplifiers, antennas, http://www.usacanada.net/satellite/te30.htm, published at least as early as Mar. 14, 2001, 3 pages. http://www.usacanada.net.satellite/te30.htm, published at least as early as Mar. 14, 2001, 3 pages.

* cited by examiner

| STREAM #1 BEST ALIGNED APU SHORT INTO THE CUT ($\Delta_1 > 0$) | STREAM #2 BEST ALIGNED APU SHORT INTO THE CUT ($\Delta_2 < 0$) | 12 MSEC. < AUDIO GAP < 24 MSEC. ($\Delta_1 - \Delta_2$) | FIGS. 16A, 16B, 16C |
|---|---|---|---|
| | | 0 MSEC. < AUDIO GAP < 12 MSEC. ($\Delta_1 - \Delta_2$) | FIGS. 17A, 17B |
| | STREAM #2 BEST ALIGNED APU LONG INTO THE CUT ($\Delta_2 > 0$) | 0 MSEC. < AUDIO GAP < 12 MSEC. ($\Delta_1 - \Delta_2$) | FIGS. 18A, 18B |
| | | 0 MSEC. < AUDIO OVERLAP < 12 MSEC. ($\Delta_2 - \Delta_1$) | FIGS. 19A, 19B |
| STREAM #1 BEST ALIGNED APU LONG INTO THE CUT ($\Delta_1 < 0$) | STREAM #2 BEST ALIGNED APU SHORT INTO THE CUT ($\Delta_2 < 0$) | 0 MSEC. < AUDIO GAP < 12 MSEC. ($\Delta_1 - \Delta_2$) | FIGS. 20A, 20B |
| | | 0 MSEC. < AUDIO OVERLAP < 12 MSEC. ($\Delta_2 - \Delta_1$) | FIGS. 21A, 21B |
| | STREAM #2 BEST ALIGNED APU LONG INTO THE CUT ($\Delta_2 > 0$) | 12 MSEC. < AUDIO OVERLAP < 24 MSEC. ($\Delta_2 - \Delta_1$) | FIGS. 22A, 22B, 22C |
| | | 0 MSEC. < AUDIO OVERLAP < 12 MSEC. ($\Delta_2 - \Delta_1$) | FIGS. 23A, 23B |

FIG. 15

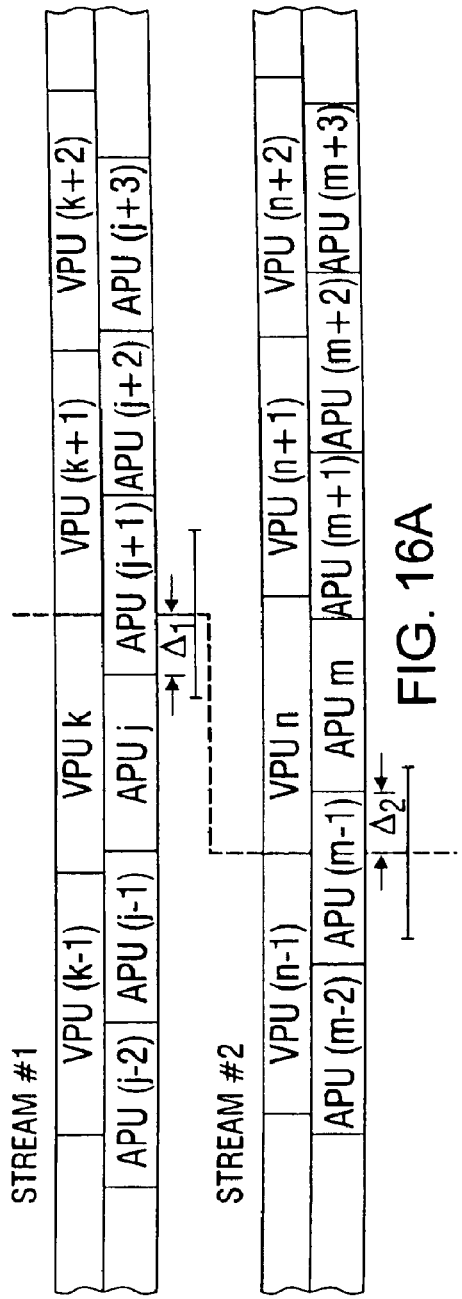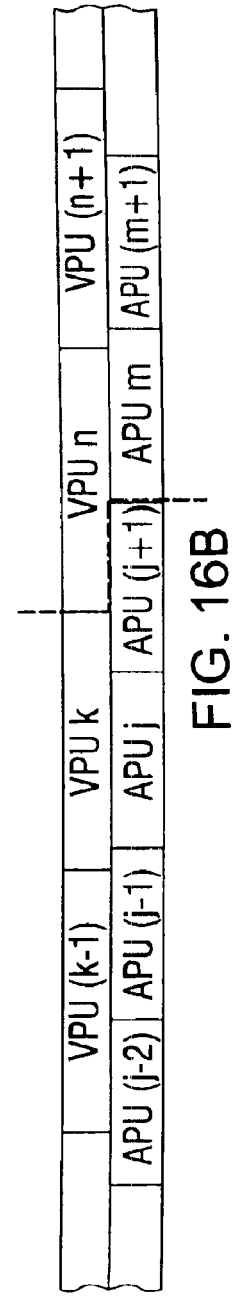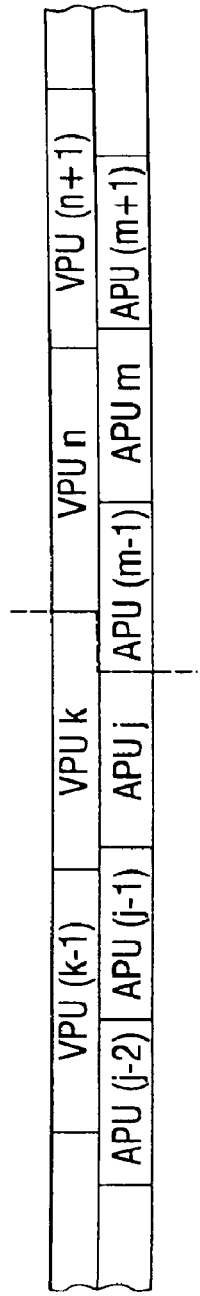

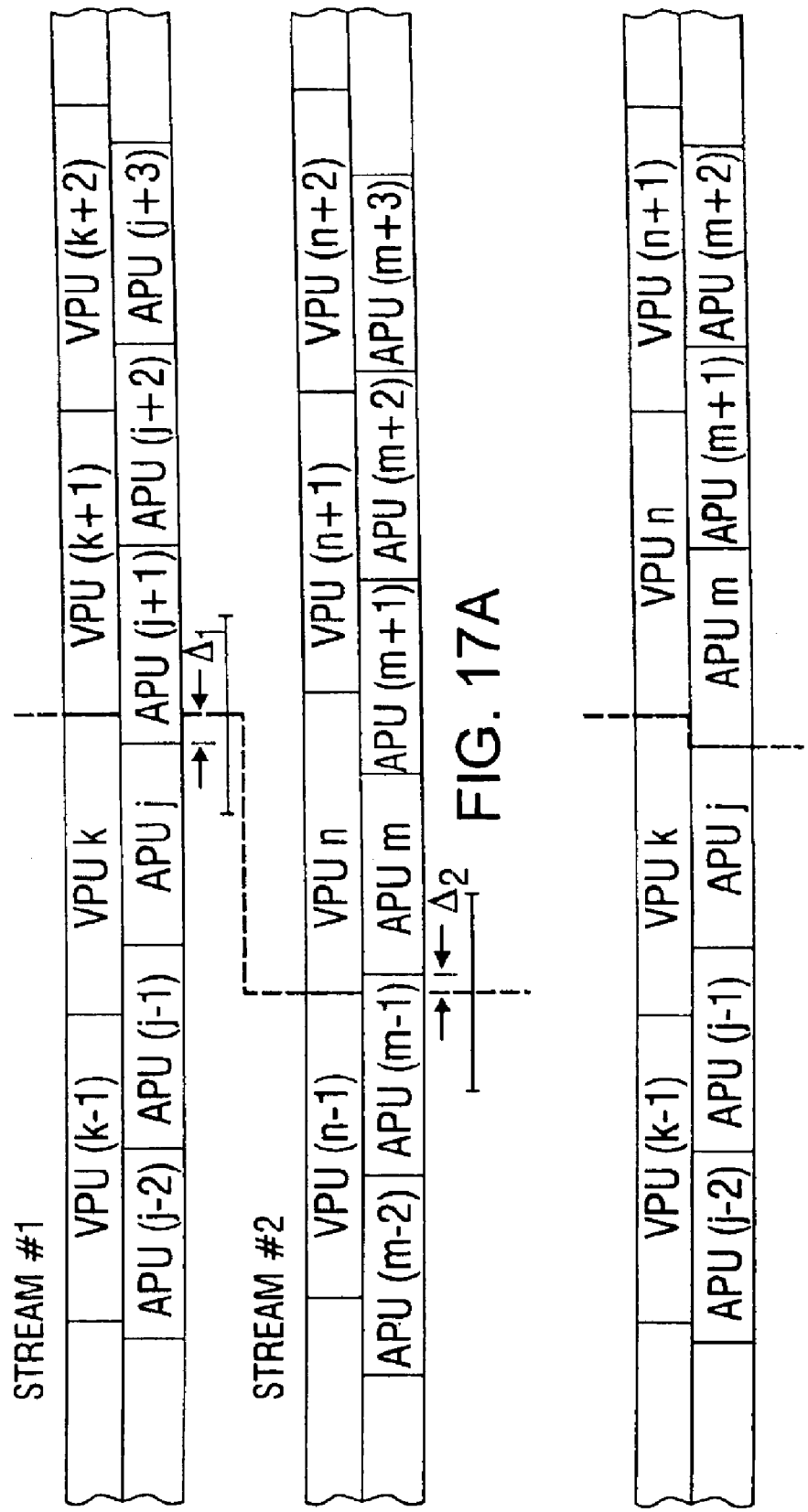

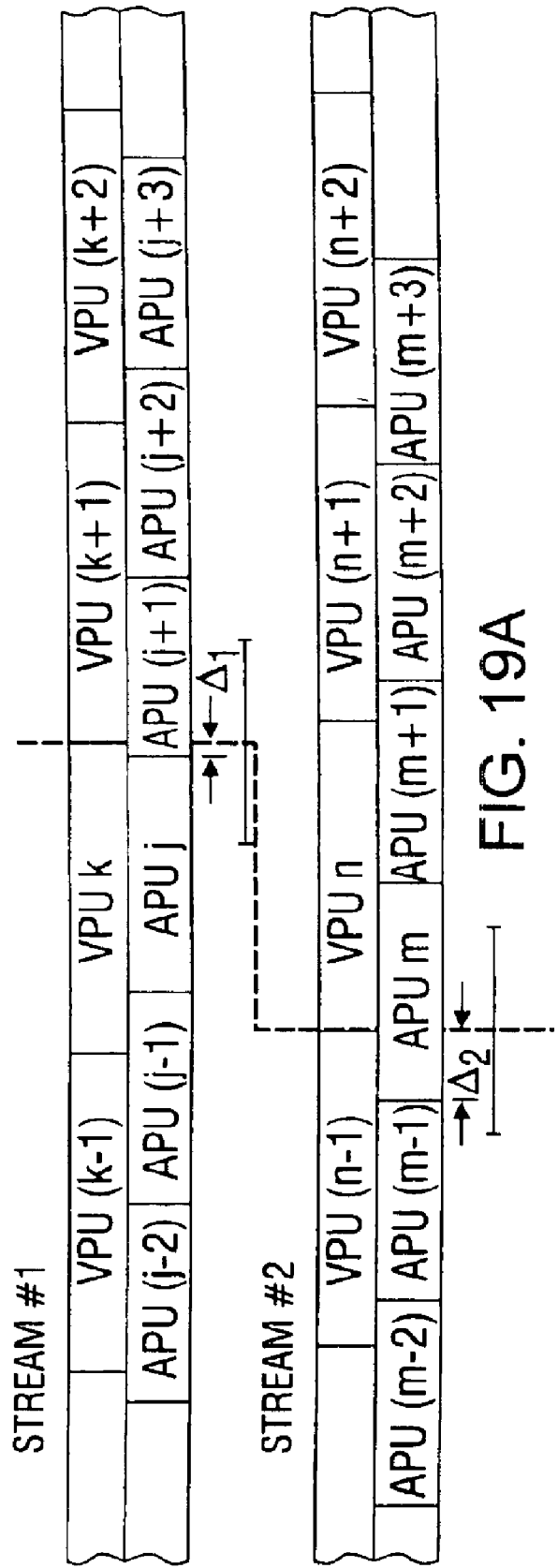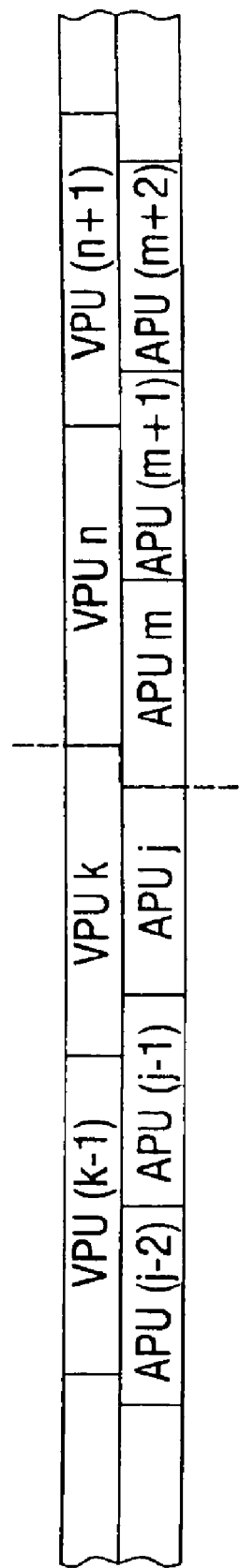

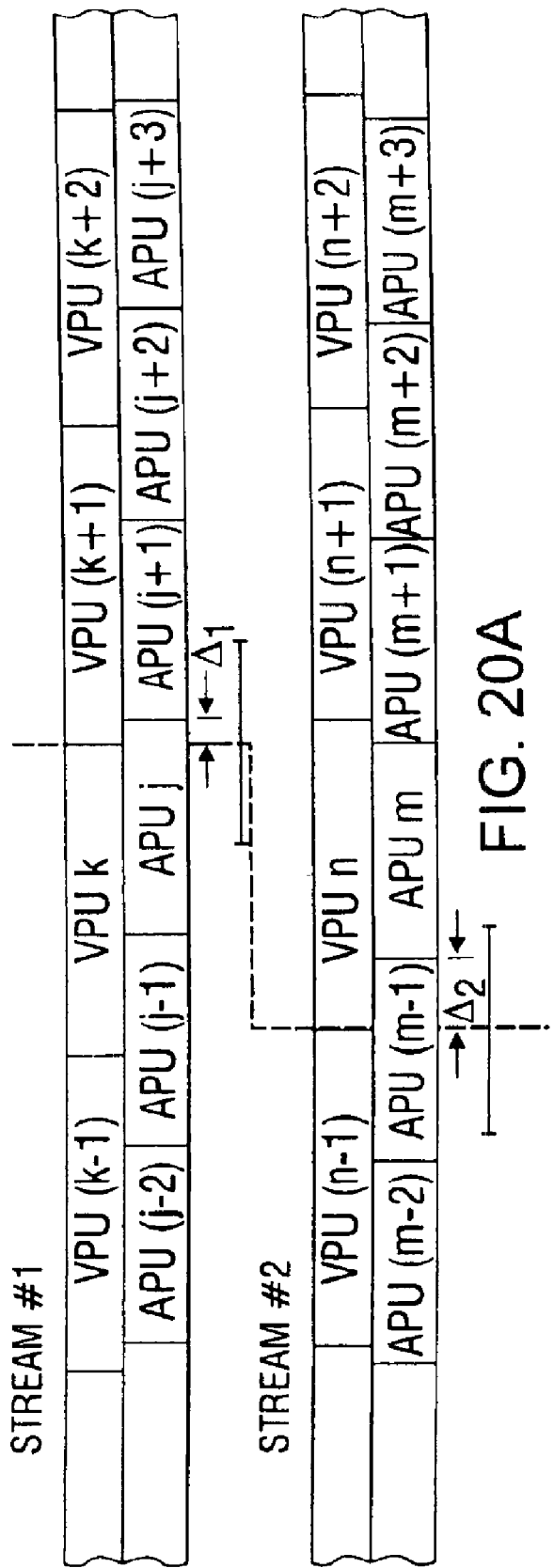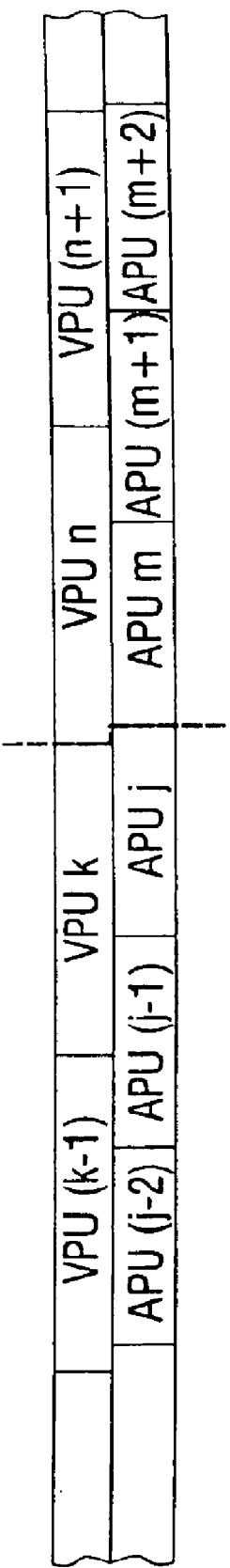
FIG. 20A
FIG. 20B

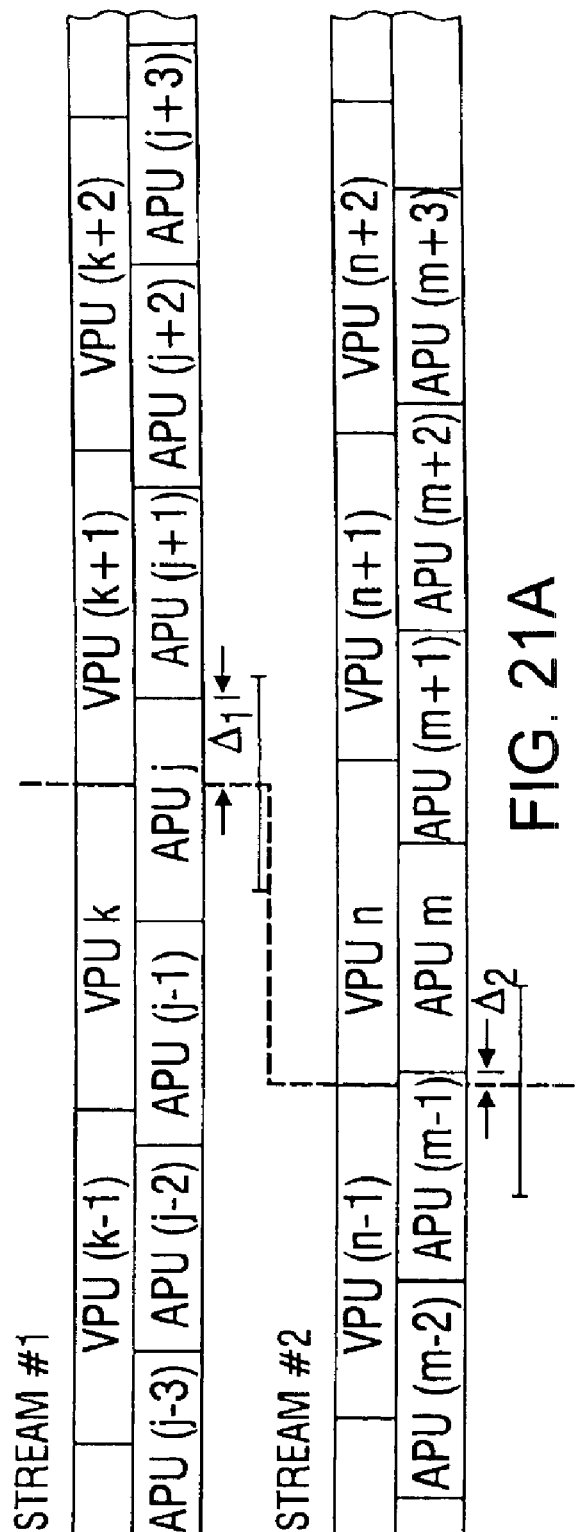
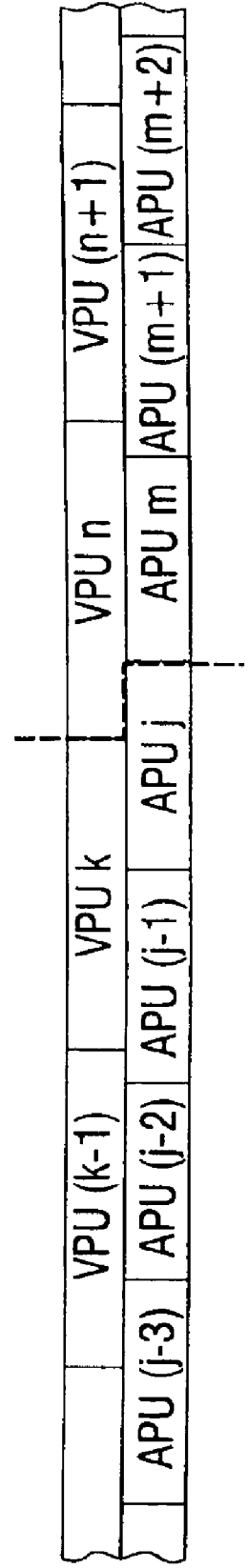
FIG. 21A
FIG. 21B

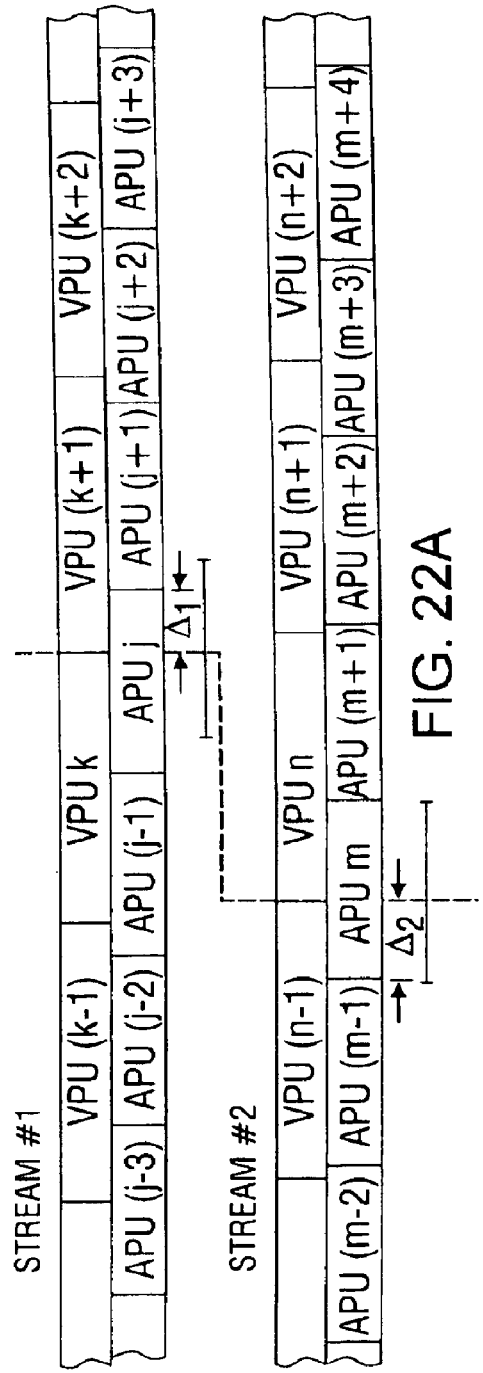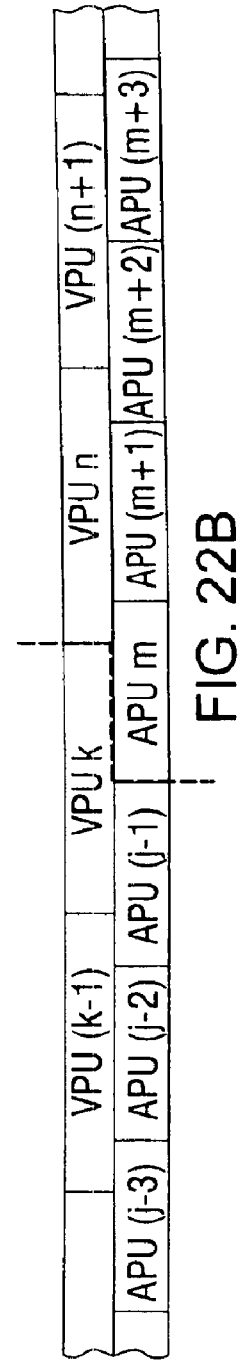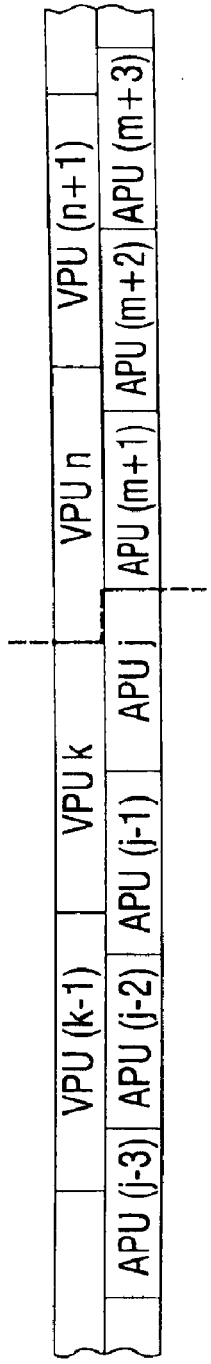

| CASE | SCOND CLIP HAS A HIGH MEAN AUDIO BUFFER LEVEL | SECOND CLIP HAS A LOW MEAN AUDIO BUFFER LEVEL |
|---|---|---|
| FIG. 16A | USE FIG. 27 | USE FIG16B OR 16C |
| FIG. 17A | USE FIG. 17B | USE FIG. 28 |
| FIG. 18A | USE FIG. 18B | USE FIG. 29 |
| FIG. 19A | USE FIG. 30 | USE FIG. 19B |
| FIG. 20A | USE FIG. 20B | USE FIG. 31 |
| FIG. 21A | USE FIG. 32 | USE FIG. 21B |
| FIG. 22A | USE FIG. 22B OR 22C | USE FIG. 33 |
| FIG. 23A | USE FIG. 34 | USE FIG. 23B |

FIG. 26

MPEG ENCODER CONTROL PROTOCOL FOR ON-LINE ENCODING AND MPEG DATA STORAGE

A portion of the disclosure of this patent document contains computer commands to which the claim of copyright protection is made. The copyright owner has no objection to the facsimile reproduction by any person of the patent document or the patent disclosure, as it appears in the U.S. Patent and Trademark Office patent file or records, but reserves all other rights whatsoever.

BACKGROUND OF THE INVENTION

1. Field of the Invention

The present invention relates to processing and storage of compressed visual data, and in particular the on-line encoding of MPEG data for storage, splicing, or other processing in a video server.

2. Background Art

It has become common practice to compress audio/visual data in order to reduce the capacity and bandwidth requirements for storage and transmission. One of the most popular audio/video compression techniques is MPEG. MPEG is an acronym for the Moving Picture Experts Group, which was set up by the International Standards Organization (ISO) to work on compression. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P-frames and B-frames. Each I frame can be decoded without information from any preceding and/or following frame. Decoding of a P frame requires information from a preceding frame in the GOP. Decoding of a B frame requires information from a preceding and following frame in the GOP. To minimize decoder buffer requirements, each B frame is transmitted in reverse of its presentation order, so that all the information of the other frames required for decoding the B frame will arrive at the decoder before the B frame.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets. The standard specifies the organization of the elementary streams and the transport streams, and imposes constraints to enable synchronized decoding from the audio and video decoding buffers under various conditions.

The MPEG-2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Information: Video," and ISO/IEC IS 13818-3, "Information Technology-Generic Coding of Moving Pictures and Associated Audio Information: Audio," incorporated herein by reference. A concise introduction to MPEG is given in "A guide to MPEG Fundamentals and Protocol Analysis (Including DVB and ATSC)," Tektronix Inc., 1997, incorporated herein by reference.

Splicing of audio/visual programs is a common operation performed, for example, whenever one encoded television program is switched to another. Splicing may be done for commercial insertion, studio routing, camera switching, and program editing. The splicing of MPEG encoded audio/visual streams, however, is considerably more difficult than splicing of the uncompressed audio and video. The P and B frames cannot be decoded without a preceding I frame, so that cutting into a stream after an I frame renders the P and B frames meaningless. The P and B frames are considerably smaller than the I frames, so that the frame boundaries are not evenly spaced and must be dynamically synchronized between the two streams at the time of the splice. Moreover, because a video decoder buffer is required to compensate for the uneven spacing of the frame boundaries in the encoded streams, splicing may cause underflow or overflow of the video decoder buffer.

The problems of splicing MPEG encoded audio/visual streams are addressed to some extent in Appendix K, entitled "Splicing Transport Streams," to the MPEG-2 standard ISO/IEC 13818-1 1996. Appendix K recognizes that a splice can be "seamless" when it does not result in a decoding discontinuity, or a splice can be "non-seamless" when it results in a decoding discontinuity. In either case, however, it is possible that the spliced stream will cause buffer overflow.

The Society of Motion Picture and Television Engineers (SMPTE) apparently thought that the ISO MPEG-2 standard was inadequate with respect to splicing. They promulgated their own SMPTE Standard 312M, entitled "Splice Points for MPEG-2 Transport Streams," incorporated herein by reference. The SMPTE standard defines constraints on the encoding of and syntax for MPEG-2 transport streams such that they may be spliced without modifying the packetized elementary stream (PES) packet payload. The SMPTE standard includes some constraints applicable to both seamless and non-seamless splicing, and other constraints that are applicable only to seamless splicing. For example, for seamless and non-seamless splicing, a splice occurs from an Out Point on a first stream to an In Point on a second stream. The Out Point is immediately after an I frame or P frame (in presentation order). The In Point is just before a sequence header and I frame in a "closed" GOP (i.e., no prediction is allowed back before the In Point).

As further discussed in Norm Hurst and Katie Cornog, "MPEG Splicing: A New Standard for Television—SMPTE 312M," SMPTE Journal, November 1998, there are two buffering constraints for seamless splicing. The startup delay at the In Point must be a particular value, and the ending delay at the Out Point must be one frame less than that. Also, the old stream must be constructed so that the video decoder buffer (VBV buffer) would not overflow if the bit rate were suddenly increased to a maximum splice rate for a period of a splice decoding delay before each Out Point.

In the broadcast environment, frame accuracy is an important consideration whenever audio or digital video streams are spliced. If frame accuracy is not ensured, then desired frames will be missing from the spliced video stream, and undesired frames will appear in the spliced video stream. If frame inaccuracy accumulates, there could be serious schedule problems. The loss or addition of one or more frames is especially troublesome when commercials are inserted into program streams. Each commercial is a very short clip and the loss or addition of just a few frames can have a noticeable effect on the content of the commercial. More importantly, the loss or addition of just a few frames may result in a substantial loss of income from advertisers, because advertisers are charged a high price for each second of on-air commercial time.

In order to ensure frame accuracy in the broadcast environment, it is common practice to include a vertical interval time code (VITC) in the analog video waveform to identify each video field and frame or to use an external LTC (Longitudinal Time Code) synchronized to a house clock. The VITC occurs on a scan line during each vertical blanking interval. For digital video, each VITC can be digitized to provide a digital vertical interval time code (DVITC) for each video field and frame. The VITC and DVITC are used when the video source is a VTR. LTC is used when the video source is a satellite feed. For example, for a 525 line video system, each VITC can be digitized to an eight-bit value in accordance with SMPTE standard 266M-1994. Splicing operations can be triggered upon the occurrence of a specified VITC or DVITC value in an analog or digital video stream or from an LTC input.

Video streams are often encoded in the MPEG-2 format for storage in video server. In such a system, there are two encoder types that can be used: off-line and on-line. Off-line encoders are frame accurate and generate accurate files but they are controlled by external operators and not by the server. On the other hand, on-line encoders encode all the time and there is no external control of the location of an I frame. The I frames occur at fairly regular intervals, depending on the particular encoding procedure followed by the encoder. If the encoded MPEG stream is to be subdivided into clips, then the server must record complete GOPs. In other words, each clip must begin with the I frame of a GOP, and end with the last frame of a GOP. However, if a clip is to be used in a splicing operation and the In-point for the clip is not an I-frame in the clip or the Out-point is not the last frame of a GOP, then the splicing operation may require additional processing or result in undesirable visual artifacts or have the effect of introducing frame inaccuracy.

The encoded MPEG-2 clip could be decoded and re-encoded off-line so that the desired In-point and Out-point are valid and desirable splice points for seamless splicing, but such decoding and re-encoding requires significant processing time and resources. Seamless splicing techniques have been devised for splicing MPEG-2 clips without decoding and re-encoding, but these techniques have the effect of introducing some frame inaccuracy when delays are introduced to avoid video buffer (VBV) underflow or overflow. For example, with these seamless splicing techniques, if the In-point is a predicted frame instead of an I-frame then some delay may be introduced in the presentation time of the In-point in order to load the video buffer at least with the I frame upon which predicted frame is based. Moreover, if the Out-point is not the last frame of a GOP, then some delay may be introduced in the presentation time of the following frame in the spliced stream. These seamless splicing techniques are further disclosed in Daniel Gardere et al. U.S. Provisional Application Ser. No. 60/174, 260, filed Jan. 4, 2000, entitled "Seamless Splicing of Encoded MPEG Video and Audio," pending as U.S. Non-Provisional Application Serial No. 09/540,347 filed Mar. 31, 2000, and to be published as European Patent Application No. 00204717.3 filed 22 Dec. 2000. Since on-line encoders are being used more frequently in the broadcast environment, there is a need for ensuring better frame accuracy when MPEG-2 coded video from an on-line encoder is stored as a clip or otherwise prepared or used for splicing in a video server.

SUMMARY OF THE INVENTION

In accordance with one aspect of the invention, there is provided a method of operating an on-line MPEG video encoder during real-time encoding of an incoming video stream to produce an MPEG Transport Stream. The incoming video stream includes video frames having respective time codes. The method includes the on-line MPEG video encoder comparing the time codes of video frames in a first portion of the incoming video stream to a first time code specification to locate, in the incoming video stream, a first video frame having a time code specified by the first time code specification, and the on-line MPEG video encoder starting a new closed group of pictures (GOP) in the MPEG Transport Stream including the first video frame encoded as a first I frame of the new closed GOP. The method further includes the on-line MPEG video encoder comparing the time codes of video frames in a second portion of the incoming video stream to a second time code specification to identify, in the incoming video stream, a second video frame having a time code specified by the second time code specification, and the on-line MPEG video encoder terminating a GOP in the MPEG transport stream to produce a terminated GOP, the terminated GOP having a last video frame immediately preceding the second video frame.

In accordance with another aspect, the invention provides a method of operating an on-line MPEG video encoder during real-time encoding of an incoming video stream to produce an MPEG Transport Stream. The method includes the on-line MPEG video encoder comparing time codes of video frames in the incoming video stream to a list of time code specifications for splice points, and upon finding a video frame in the incoming video stream having a time code specified by a time code specification for a splice point in the list, the on-line MPEG encoder starting a new closed group of pictures (GOP) in the MPEG Transport Stream. The new closed GOP includes a video frame having the time code specified by the specification for the splice point in the list. Moreover, the video frame having the time code specified by the specification for the splice point in the list is encoded as a first I frame of the new closed GOP.

In accordance with yet another aspect, the invention provides a method of operating an on-line MPEG video encoder and a video server. The on-line MPEG video encoder encodes in real time an incoming video stream to produce an MPEG Transport Stream. The video server receives the MPEG Transport Stream and records a segment of the MPEG Transport Stream as a clip. The incoming video stream includes video frames having respective time codes. The method includes the on-line MPEG video encoder comparing the time codes of video frames in a first portion of the incoming video stream to a time code specification for a first video frame to be included in the clip in order to locate, in the incoming video stream, a first video frame to be included in the clip. The on-line MPEG video encoder starts a new closed group of pictures (GOP) in the MPEG Transport Stream. The new closed GOP includes the first video frame to be included in the clip as a first I frame of the new closed GOP. The method further includes the on-line MPEG video encoder comparing the time codes of video frames in a second portion of the incoming video stream to a time code specification for a last video frame to be included in the clip in order to locate, in the incoming video stream, the last video frame to be included in the clip. The on-line MPEG video encoder terminates a GOP in the MPEG transport stream to produce a terminated GOP encoding the last video frame to be included in the clip as the last video frame in the terminated GOP. The method further includes the on-line MPEG video encoder inserting, in a GOP header for each GOP in the transport stream, a time code of at least the first video frame to be displayed from the GOP. Moreover, the method further includes the video server searching the time codes in the GOP headers in the MPEG Transport Stream to locate the first video frame to be included in the clip and to record the clip in storage of the video server.

In accordance with still another aspect, the invention provides a method of operating an on-line MPEG-2 video encoder and a video server. The on-line MPEG-2 video encoder encodes in real time an incoming video stream to produce an MPEG-2 Transport Stream. The video server receives the MPEG-2 Transport Stream and records a segment of the MPEG-2 Transport Stream as a clip. The incoming video stream includes video frames having respective time codes. The method includes a controller receiving from an operator a specification for the video frames to be included in the clip. The controller establishes a data link with the on-line MPEG-2 video encoder and with the video server, and transmits to the encoder and the video server the specification for the video frames to be included in the clip. The on-line MPEG-2 video encoder compares time codes of video frames in the incoming video stream to a time code specification for a first video frame to be included in the clip in order to locate, in the incoming video stream, a first video frame to be included in the clip. The on-line MPEG-2 video encoder starts a new closed group of pictures (GOP) in the MPEG-2 Transport Stream. The new closed GOP includes the first video frame to be included in the clip as a first I frame of the new closed GOP. The on-line MPEG-2 video encoder inserts at least the time code for the first video frame to be included in the clip into a GOP header for the new closed GOP in the MPEG-2 transport stream, and the on-line MPEG-2 video encoder terminates a GOP in the MPEG-2 Transport Stream to produce a terminated GOP encoding a last video frame to be encoded in the clip as the last video frame in the terminated GOP. The method further includes the video server searching the MPEG-2 Transport Stream for the video frame having the time code for the first video frame to be included in the clip to locate the first video frame to be included in the clip. The video server records the clip in storage of the video server.

In accordance with still another aspect, the invention provides an on-line MPEG video encoder for real-time encoding of an incoming video stream to produce an MPEG Transport Stream. The incoming video stream includes video frames having respective time codes. The on-line MPEG video encoder has a data link input for receiving remote control commands including time code specifications from an external controller. The on-line MPEG video encoder is programmed for comparing the time codes of video frames in a first portion of the incoming video stream to a first time code specification to locate, in the incoming video stream, a first video frame having a time code specified by the first time code specification, and to start a new closed group of pictures (GOP) in the MPEG Transport Stream including the first video frame encoded as a first I frame of the new closed GOP. The on-line MPEG video encoder is also programmed to compare the time codes of video frames in a second portion of the incoming video stream to a second time code specification to identify, in the incoming video stream, a second video frame having a time code specified by the second time code specification, and to terminate a GOP in the MPEG transport stream to produce a terminated GOP, the terminated GOP having a last video frame immediately preceding the second video frame.

In accordance with yet still another aspect, the invention provides an on-line MPEG video encoder for real-time encoding of an incoming video stream to produce an MPEG Transport Stream. The on-line MPEG video encoder has a data link input for receiving remote control commands including time code specifications from an external controller. The on-line MPEG video encoder is programmed for comparing time codes of video frames in the incoming video stream to a list of time code specifications for splice points, and upon finding a time code of a video frame in the incoming video stream specified by a time code specification for a splice point in the list, for starting a new closed group of pictures (GOP) in the MPEG Transport Stream. The new closed GOP includes a video frame having the time code specified by the specification for the splice point in the list, and the video frame having the time code specified by the specification for the splice point in the list is encoded as a first I frame of the new closed GOP.

In accordance with yet still another aspect, the invention provides a video encoding and recording system. The system includes an on-line MPEG video encoder for encoding in real time an incoming video stream to produce an MPEG Transport Stream. The incoming video stream includes video frames having respective time codes. The system also includes a video server coupled to the on-line MPEG video encoder for receiving the MPEG Transport Stream and recording a segment of the MPEG Transport Stream as a clip. The on-line MPEG video encoder is programmed for comparing the time codes of video frames in a first portion of the incoming video stream to a time code specification for a first video frame to be included in the clip in order to locate, in the incoming video stream, a first video frame to be included in the clip, and for starting a new closed group of pictures (GOP) in the MPEG Transport Stream. The new closed GOP includes the first video frame to be included in the clip as a first I frame of the new closed GOP. Moreover, the on-line MPEG video encoder is programmed for comparing the time codes of video frames in a second portion of the incoming video stream to a time code specification for a last video frame to be included in the clip in order to locate, in the incoming video stream, the last video frame to be included in the clip, and for terminating a GOP in the MPEG transport stream to produce a terminated GOP encoding the last video frame to be included in the clip as the last video frame in the terminated GOP. The on-line MPEG video encoder is also programmed for inserting, in a GOP header for each GOP in the transport stream, a time code of at least the first video frame to be displayed from the GOP. The video server is programmed for searching the time codes in the GOP headers in the MPEG Transport Stream to locate the first video frame to be included in the clip and to record the clip in storage of the video server.

In accordance with a final aspect, the invention provides a video encoding and recording system. The system includes an on-line MPEG-2 video encoder for encoding in real time an incoming video stream to produce an MPEG-2 Transport Stream. The incoming video stream includes video frames having respective time codes. The system also includes a video server coupled to the on-line MPEG-2 video encoder for receiving the MPEG Transport Stream and recording a segment of the MPEG Transport Stream as a clip. The system further includes a controller for receiving from an operator a specification for the video frames to be included in the clip and coupled by at least one data link to the on-line MPEG-2 video encoder and the video server for transmitting to the encoder and to the video server the specification for the video frames to be included in the clip. The on-line MPEG-2 video encoder is programmed for comparing time codes of video frames in the incoming video stream to a time code specification for a first video frame to be included in the clip in order to locate, in the incoming video stream, a first video frame to be included in the clip, and for starting a new closed group of pictures (GOP) in the MPEG-2 Transport Stream. The new closed GOP includes the first video frame to be included in the clip as a first I frame of the new closed GOP. The on-line MPEG-2 video encoder is programmed for inserting at least the time code for the first video frame to be included in the clip into a GOP header for the new closed GOP in the MPEG-2 transport stream. The on-line MPEG-2 video encoder is further programmed for terminating a GOP in the MPEG-2 Transport Stream to produce a terminated GOP encoding a last video frame to be encoded in the clip as the last video frame in the terminated GOP. Moreover, the video server is programmed for searching the MPEG-2 Transport Stream for a video frame having the time code for the first video frame to be included in the clip to locate the first video frame to be included in the clip, and for recording the clip in storage of the video server.

BRIEF DESCRIPTION OF THE DRAWINGS

Other objects and advantages of the invention will become apparent upon reading the detailed description with reference to the drawings, in which:

FIG. 15 is a logic table showing eight cases for the selection of audio presentation units to be included in the splicing of two MPEG transport streams;

FIG. 16A is a diagram showing content of video and audio presentation unit streams for the two MPEG transport streams for a first case in the logic table of FIG. 15;

FIG. 16B is a diagram showing the content of video and audio presentation unit streams resulting from a first possible splicing of the two MPEG transport streams shown in FIG. 16A;

FIG. 16C is a diagram showing the content of video and audio presentation unit streams resulting from a second possible splicing of the two MPEG transport streams shown in FIG. 16A;

FIG. 17A is a diagram showing content of video and audio presentation unit streams for the two MPEG transport streams for a second case in the logic table of FIG. 15;

FIG. 17B is a diagram showing the content of video and audio presentation unit streams resulting from splicing of the two MPEG transport streams shown in FIG. 17A;

FIG. 19A is a diagram showing content of video and audio presentation unit streams for the two MPEG transport streams for a fourth case in the logic table of FIG. 15;

FIG. 19B is a diagram showing the content of video and audio presentation unit streams resulting from splicing of the two MPEG transport streams shown in FIG. 19A;

FIG. 20A is a diagram showing content of video and audio presentation unit streams for the two MPEG transport streams for a fifth case in the logic table of FIG. 15;

FIG. 20B is a diagram showing the content of video and audio presentation unit streams resulting from splicing of the two MPEG transport streams shown in FIG. 20A;

FIG. 21A is a diagram showing content of video and audio presentation unit streams for the two MPEG transport streams for a sixth case in the logic table of FIG. 15;

FIG. 21B is a diagram showing the content of video and audio presentation unit streams resulting from splicing of the two MPEG transport streams shown in FIG. 21A;

FIG. 22A is a diagram showing content of video and audio presentation unit streams for the two MPEG transport streams for a seventh case in the logic table of FIG. 15;

FIG. 22B is a diagram showing the content of video and audio presentation unit streams resulting from a first possible splicing of the two MPEG transport streams shown in FIG. 22A;

FIG. 22C is a diagram showing the content of video and audio presentation unit streams resulting from a second possible splicing of the two MPEG transport streams shown in FIG. 22A;

FIG. 26 is a logic table showing how the first and second clips for the cases of FIGS. 16A to 23A should be spliced when the second clip has a high or low mean audio buffer level close to overflowing or underflowing respectively;

Figure 1:
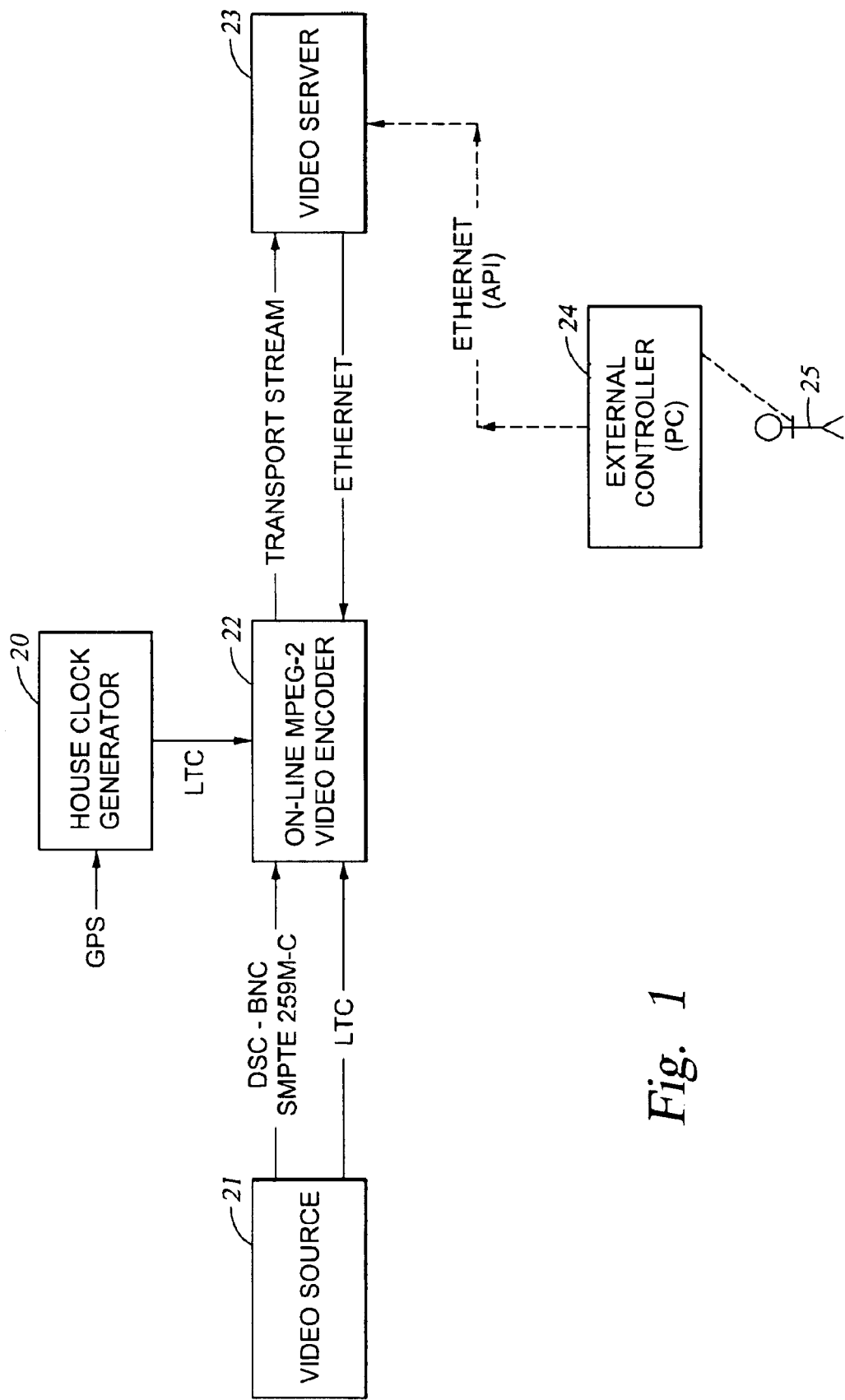
FIG. 1 is a block diagram of a first system for encoding and recording MPEG-2 encoded video data in accordance with the invention.

While the invention is susceptible to various modifications and alternative forms, specific embodiments thereof have been shown by way of example in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a digital video recording system including a video source 21, an on-line MPEG-2 video encoder 22, a video server 23, an external controller 24, and a house clock generator 20 synchronized to a global positioning system (GPS) clock signal. As used herein, the term "on-line" is intended to be synonymous with "real-time." The video source 21, such as a TV camera, video tape deck, or video disk player, provides a digital video signal over a digital serial channel (DSC) using a coaxial cable connection (BNC). For example, the video source may include an NTSC or PAL composite video signal, or a digital serial channel compliant with the serial digital interface (SDI) standard, and in particular the International Telecommunications Union standard ITU-R-656 or the SMPTE standard RS259. The on-line MPEG-2 video encoder 22 provides an MPEG-2 Transport Stream (TS) to the video server 23. The video server 23 is a storage system for storing video clips, each of which is a segment from the MPEG-2 Transport Stream. Each clip includes a series of complete and contiguous groups of pictures (GOPs) in the MPEG-2 Transport Stream. A suitable video server 23 is described in Duso et al. U.S. Pat. No. 5,892,915 issued Apr. 6, 1999, incorporated herein by reference. This kind of video server 23 is manufactured and sold by EMC Corporation, 35 Parkwood Dr., Hopkinton, Mass. 01748. The house clock generator 20 produce a longitudinal time code (LTC) with very high accuracy obtained from the GPS clock signal, which is synchronized with different time zones clocks. The LTC signal from the house clock generator 20 is also locked to a reference signal such as a black burst. The LTC signal from the house clock generator 20 is fed to the on-line MPEG-2 encoder 22 in order to allow frame synchronization with a satellite feed of video for frame accurate encoding of transmitted video.

The on-line MPEG-2 video encoder 22 is designed to record non-stop feeds such as live events. Therefore, it is always encoding its digital video input to provide a Transport Stream as output. Most of the operators dealing with MPEG-2 servers are willing to use on-line encoders for several reasons. On-line encoders are often of better quality. They are easily integrated in a broadcast center (composite video or SDI input, DVB/ASI/LVDS or ATM output). This feature means they can be integrated into an environment controlled by an automation system to ensure caching of video data records into a video server 23. The operator can use the same equipment for both live event and Direct To Home requirements in order to save operational costs in training, operational procedures and maintenance. In addition, it allows the operator to provide the end user, whatever the service is, with the same consistent quality of material which is very important in terms of image and customer satisfaction.

There has been a significant disadvantage with the use of a conventional on-line MPEG-2 video encoder. A conventional on-line encoder has not provided a way to force a Mark-in or Mark-out frame coming out of a video tape recorder source for instance to have the first frame in a transport stream starting a GOP or, respectively, the last frame ending a GOP. Moreover, it is difficult to predict which frame of the video source 21 will be captured and transformed into an I frame as the first or last frame of the Transport Stream (TS). Thus, the first and the last GOP of the recorded TS may get the Mark-in and Mark-out frames, respectively, along with additional frames that weren't chosen during the marking session. In addition, the duration of the clip may differ from the duration chosen because the MPEG-2 server has to store complete GOPs.

This problem can be solved by appropriate synchronization of the on-line MPEG-2 video encoder with the video server. For example, a video frame selected as a Mark-in frame is encoded as a first I-frame of a GOP that is the first GOP of a clip recorded or otherwise processed in the video server 23, and a video frame selected as a Mark-out frame immediately follows the last frame of a GOP that is the last GOP of the clip. The Mark-in frame immediately follows the In-point of the clip for splicing of the clip, and the Mark-out frame immediately follows the Out-point of the clip for splicing of the clip.

A preferred solution to the problem permits the video server 23 to record MPEG-2 clips accurately using the on-line MPEG-2 video encoder 22. A clip is said to be "accurate" if it complies with the following requirements:

(1) The first frame of the clip is really the first expected frame and is at the beginning of a new closed GOP;

(2) The number of frames of the recorded clip is really the expected number of frames (the duration is accurate);

(3) A splice point is inserted on the first and last frames to allow seamless splicing; and (4) It has substantially the same amount of audio as video frames to allow synchronization of audio and video for seamless audio splicing as further described below with reference to FIGS. 15 to 36.

It is also desirable to define four different types of clips:

(1) A clip that has splice points inserted on the first and last frames only;

(2) A clip that has splice points inserted on the first and last frames as well as on some specified frames within the clip to allow advertisement insertion during play out (the list of points where to insert splice points are provided to the encoder through an Encoder Interface Protocol as further described below);

(3) A clip that is recorded with splice points inserted on the first and last frames as well as on frames within the clip separated by a specified interval; and (4) A clip that is recorded with splice points inserted on the first and last frames as well as on each GOP (this assumes that the GOP size is constant).

To incorporate this solution in the system of FIG. 1, the digital video signal from the video source 21 contains an embedded Digital VITC signal according to SMPTE 266M, or the on-line MPEG-2 video encoder 22 receives an external LTC signal from the VTR or from the house clock generator 20. The on-line MPEG-2 video encoder 22 receives this digital video signal and extracts the time code information from the DVITC signal or from the LTC signal. The on-line MPEG-2 video encoder 22 places the respective time code information in each GOP header of the Transport Stream sent to the video server 23. The video server records at least one segment of the Transport Stream as a clip of complete GOPs containing the respective time code information in each GOP header of each GOP in the clip. In addition, the system of FIG. 1 includes an external controller 24 such as a personal computer (PC), running a control application such as an automation system, coupled by an Ethernet link network to the video server 23 to permit an operator 25 of the external controller 24 to specify video frames that should be the first and last frames in each clip and any other splice points in each clip. The video server 23 will then send a specification of the video frames that should be the first and last frames in each clip and any other splice points in each clip to the on-line MPEG-2 video encoder 22 using the encoder control protocol commands further described below.

In a preferred method of using the system of FIG. 1 to produce each clip, the operator specifies a Mark-in frame of the digital video signal from the video source 21, and a Mark-out frame of the digital video from the video source 21. The Mark-in frame will be the first frame of the clip, and the Mark-out frame will be the frame immediately following the last frame of the clip. The TC time code of the Mark-in frame will be referred to as $TC_{IN}$, and the TC time code of the Mark-out frame will be referred to as $TC_{OUT}$. The expected duration of the clip is $TC_{OUT} - TC_{IN}$. However, in a drop frames environment, the actual duration of the clip may be less than the expected duration, and therefore the expected encoded number of frames of the clip as calculated from the expected duration may differ from the actual number of encoded frames of the clip.

The external controller 24 obtains a specification of the Mark-in and Mark-out frames such as operator-specified time codes $TC_{IN}$ and $TC_{OUT}$. The external controller 24 sends the operator-specified time codes $TC_{IN}$ and $TC_{OUT}$ to the video server 23 (via an Ethernet control protocol) at least a certain time, such as one second, before the on-line MPEG-2 video encoder receives the respective Mark-in and Mark-out video frames from video source 21. The video server 23 sends the operator-specified time codes $TC_{IN}$ and $TC_{OUT}$ to the on-line MPEG-2 encoder 22 via an Ethernet control protocol. The on-line MPEG-2 video encoder 22 then prepares to create a new closed GOP starting at the Mark-in frame and another one starting at the Mark-out frame.

Figure 2:
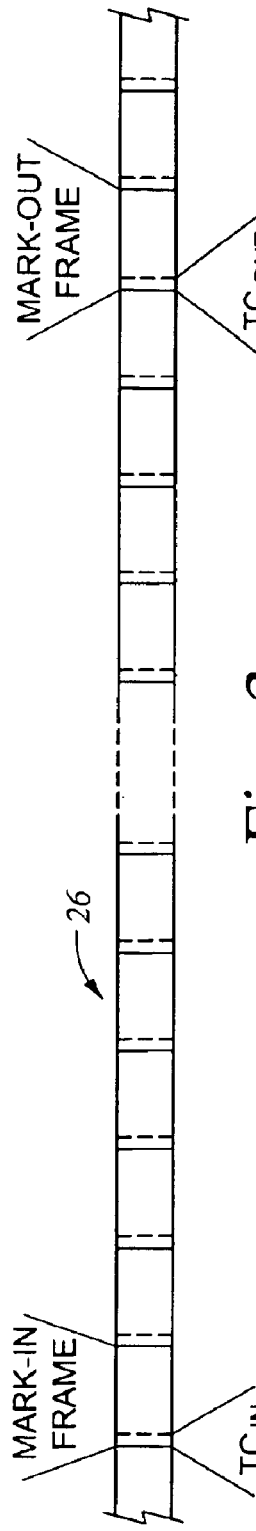
FIG. 2 is a schematic diagram of a digital video stream from the video source in FIG. 1.

FIG. 2 shows the digital video signal 26 as transmitted by the video source 21 and received by the on-line MPEG-2 video encoder 22. The on-line MPEG-2 video encoder 22 compares the operator-specified time code $TC_{IN}$ to the actual TC time codes in the digital video frames from the video source 21, or to the time codes in the LTC signal from the house clock generator 20, to identify the Mark-in video frame, and later compares the operator-specified time code $TC_{OUT}$ to the actual TC time codes in the digital video frames from the video source 21, or in the LTC signal from the house clock generator 20, to identify the Mark-out video frame.

Figure 3:
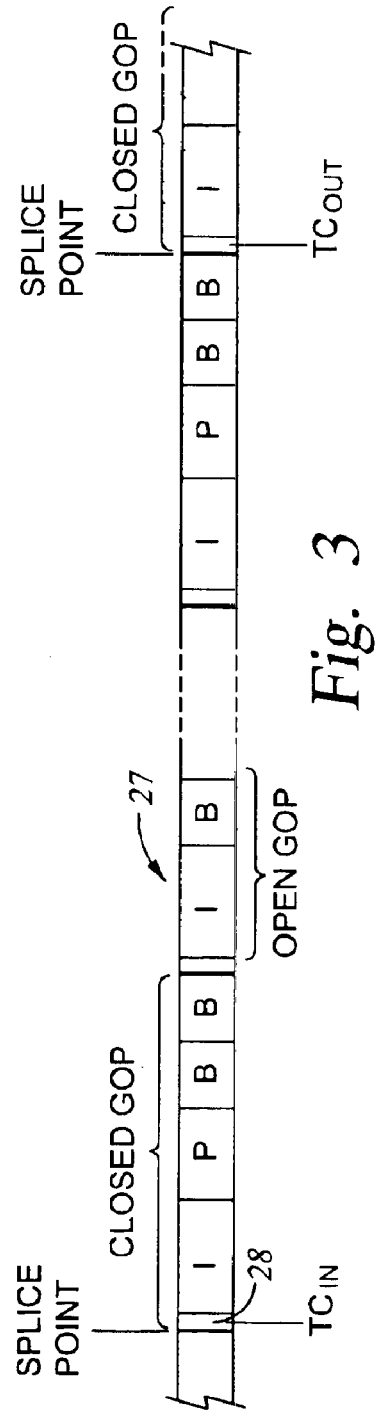
FIG. 3 is a schematic diagram of an MPEG-2 encoded Transport Stream from the on-line MPEG-2 video encoder in FIG. 1.
Figure 4:
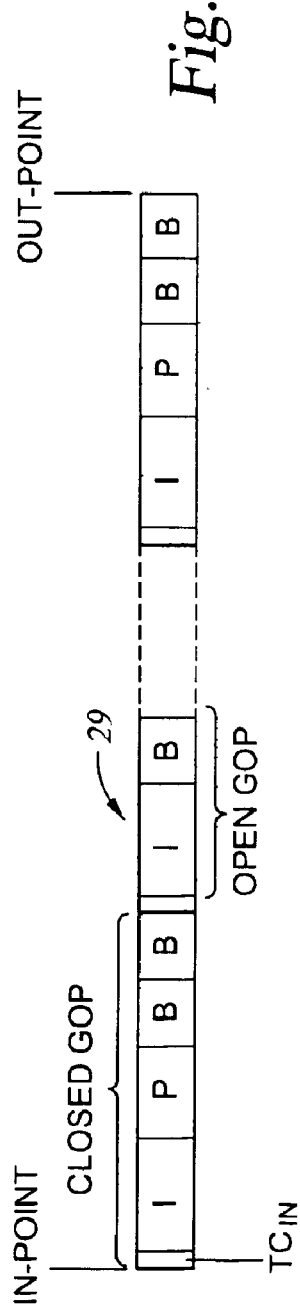
FIG. 4 is a schematic diagram of an MPEG-2 clip stored in the video server in FIG. 1.

As shown in FIG. 3, the on-line MPEG-2 video encoder 22 creates these closed GOPs in the encoded MPEG-2 Transport Stream 27 with splice points according to SMPTE-312M, each splice point type corresponding to the encoding profile (4:2:2 or 4:2:0). At the TC of Mark-In an I frame and a new GOP header is inserted and the $TC_{IN}$ value is inserted in the GOP header 28 of a first GOP having an I frame encoding the Mark in frame. The GOPs in the Transport Stream 27 are shown having a simple closed GOP structure of an I frame followed by a P frame followed by two B frames in transmission order. In this example the display order for these frames would be the I frame followed by the two B frames followed by the P frame. In general, each GOP would have more than four frames as shown, and unless the encoder were commanded to create closed GOPs, the GOPs could be open in order to provide better picture quality for a given bit transmission rate. For example, the open GOPs could have a structure I, B1, B2, P, B3, B4, . . . in transmission order, and the display order would be B1, B2, I, B3, B4, P, . . . In this example of an open GOP, the display of at least the first B frame B1 would depend on the content of the last frame of the preceding GOP.

It is recommended that the GOP preceding each splice point will be ended by a P or B (Out-point) frame rather than an I frame, in order to avoid delay that could occur in the presentation time for the (In-point) video frame beginning the GOP following the splice point. This delay could occur for filling of the decoder video buffer with data for the (In-point) video frame beginning the GOP following the splice point. More specifically, this construction of the GOP preceding each splice point can be used to achieve the seamless splicing condition of SMPTE 312M that the video decoder buffer (VBV buffer) would not overflow if the bit rate were suddenly increased to a maximum splice rate for a period of a splice decoding delay before the Out Point at the end of the GOP.

The MPEG-2 encoded Transport Stream is then passed from the encoder to the video server 23. By this time, the video server 23 has already received the operator-specified time codes $TC_{IN}$ and $TC_{OUT}$ from the external controller 24 (via the Ethernet control protocol). The video server 23 receives this Transport Stream and scans each GOP header in the Transport Stream. As soon as the operator-specified $TC_{IN}$ value matches the $TC_{IN}$ value in a GOP header, the video server begins recording of the clip, and the video server continues to record the clip until the operator-specified $TC_{OUT}$ value matches the $TC_{OUT}$ value in a GOP header. Then the video server 23 commits the clip to disk storage in the video server. Therefore the clip in disk storage consists of the GOP having the operator-specified $TC_{IN}$ value and the following GOPs up to but excluding the GOP having the operator-specified $TC_{OUT}$ value. The resulting clip 29 is shown in FIG. 3.

The first frame in the first GOP of the clip is an I-frame having the operator-specified $TC_{IN}$ value, and the last frame in the last GOP of the clip is the frame just before the frame having the operator-specified $TC_{OUT}$ value. The clip has the expected duration so long as frames have not been dropped between the desired first frame and the end of the clip. Moreover, the closed GOP and splice point at the beginning as well as the splice point at the end ensure smooth splicing while transitioning from one clip to the other during play out from the video server 23. At the end of the encoding additional audio elementary stream (ES) packets are collected from the incoming TS after the recording of the last video frame and recorded on the video server storage until the audio presentation time stamp (PTS) is greater by two video frames from the PTS of the last video frame recorded on disk.

In order to apply the above solution consistently among several different encoder manufacturers, the invention also provides a new encoder control protocol. The encoder control protocol defines specific functions for control of the on-line MPEG-2 video encoder 22 so that splice points can be triggered on specific time code values. The protocol is provided in two different variations. The first variation is for controlling an encoder having a dedicated communication link for conveying encoder control messages from the external controller, for example as described below with reference to FIG. 5 and FIG. 6. The second variation is for controlling a pool of on-line MPEG-2 video encoders via a switch, router, or similar gateway device for linking the external controller to each video encoder in the pool, for example as described below with reference to FIG. 7 and FIG. 8. This second variation also enables the gateway device to translate the encoder control messages to any other message format recognized in the on-line MPEG-2 video encoders.

Figure 5:
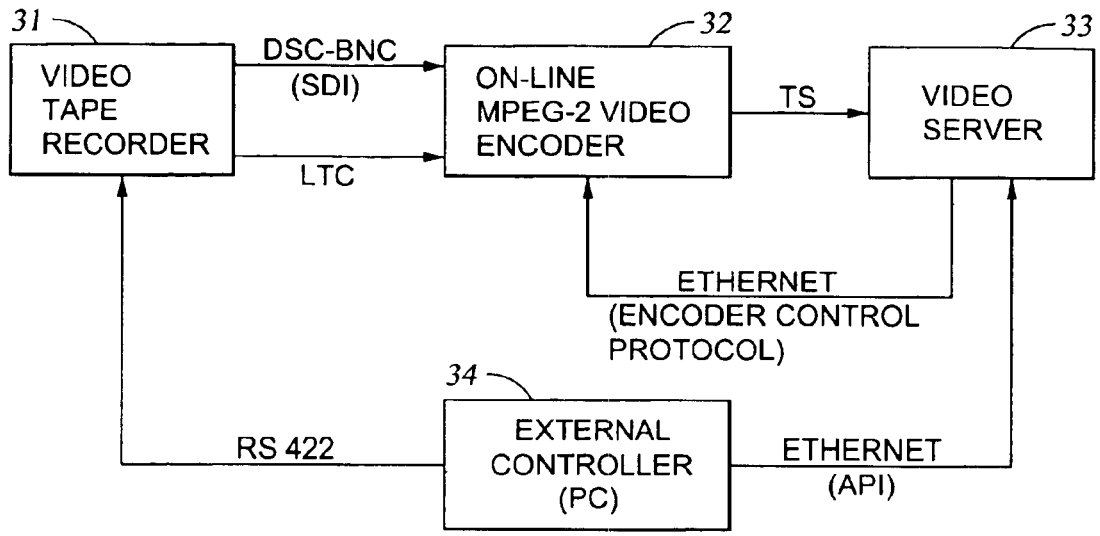
FIG. 5 is a block diagram of a second system for encoding and recording MPEG-2 encoded video data in accordance with the invention.

FIG. 5 shows a system for recording MPEG-2 clips from video tapes. A video tape recorder (VTR) 31 is directly connected to an on-line MPEG-2 video encoder 32, which in turn is connected to a video server 33. In this case, the SDI signal from the VTR 31 is directly sent to the encoder. The DVITC signal is the VITC signal stored on the tape, or alternatively the on-line MPEG-2 encoder could extract a time code from the LTC signal from the VTR 31. An encoding application, running on an external controller PC 34, controls the VTR 31 and the video server 33. The encoder 32 is controlled by the video server 33 through the encoder control protocol, as further described below, via Ethernet using the User Datagram Protocol (UDP).

Figure 6:
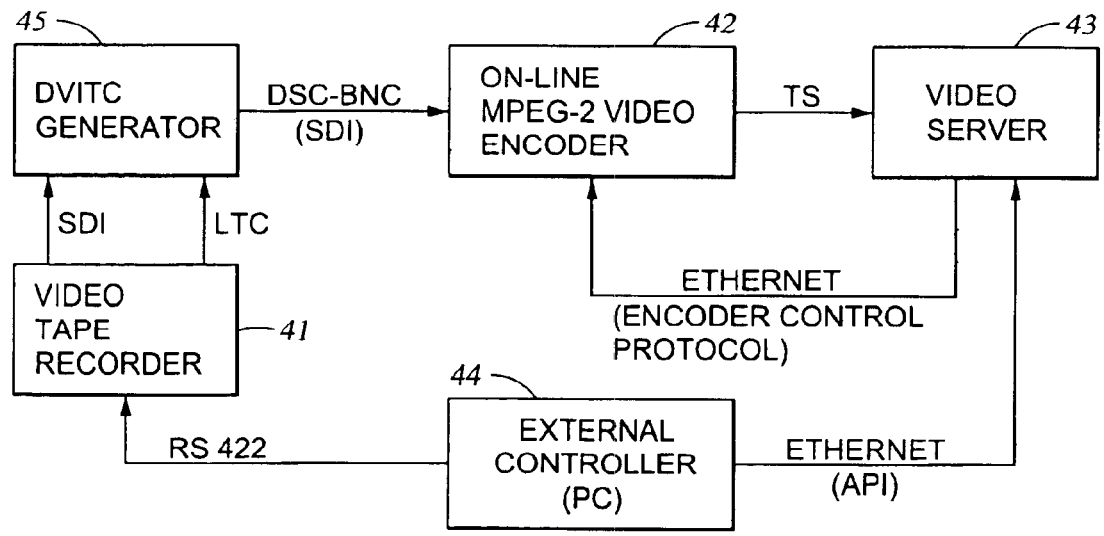
FIG. 6 is a block diagram of a third system for encoding and recording MPEG-2 encoded video data in accordance with the invention.

FIG. 6 shows a system similar to the system of FIG. 5. The system in FIG. 6 has a video tape recorder 41, an on-line MPEG-2 video encoder 44, a video server 43, and an external controller PC 44. In this system, however, the VITC signal stored on the video tape is not consistent and can't be trusted. In this case, a longitudinal time code (LTC) signal from the video tape recorder 41 can be used instead. A DVITC generator is then used to produce a DVITC signal from the LTC signal and insert the DVITC signal into the SDI stream to the on-line MPEG-2 video encoder.

Figure 7:
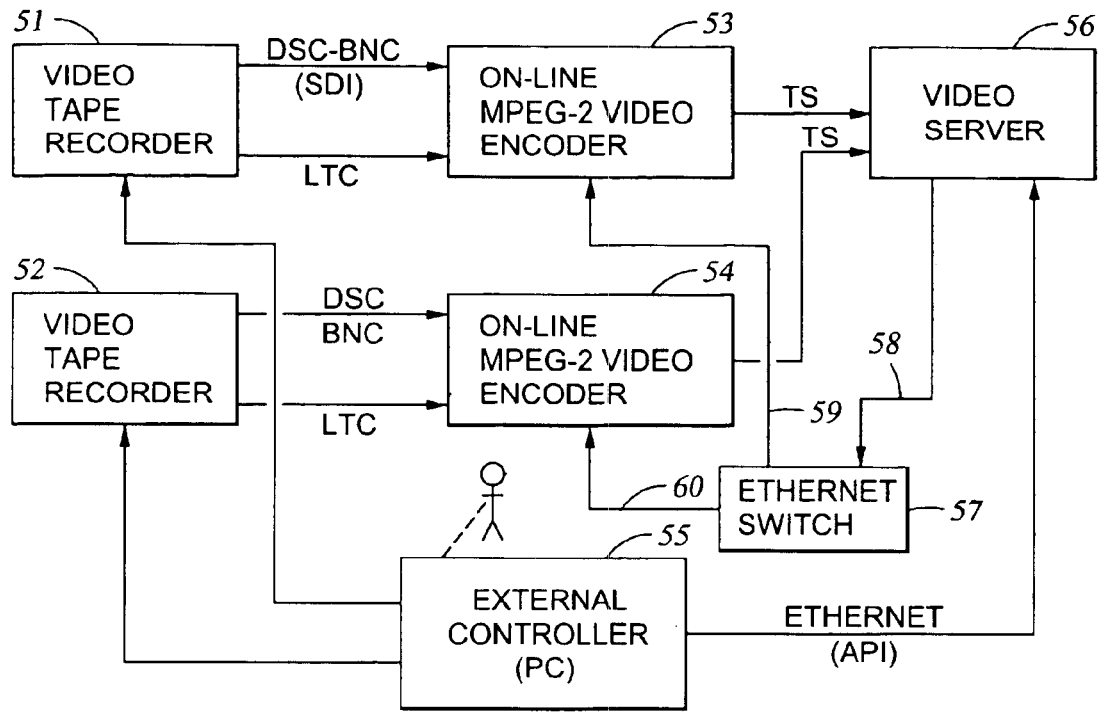
FIG. 7 is a block diagram of a fourth system for encoding and recording MPEG-2 encoded video data in accordance with the invention.

FIG. 7 shows a system in which several VTRs 51, 52 and on-line MPEG-2 video encoders 53, 54 are controlled by one external controller PC 55 to allow concurrent recordings in a video server 56. In this case, an Ethernet switch 57 permits a single Ethernet link 58 from the video server 56 to be switched to either a dedicated Ethernet link 59 to the video encoder 53 or to the dedicated Ethernet link 60 to the video encoder 54.

Figure 8:
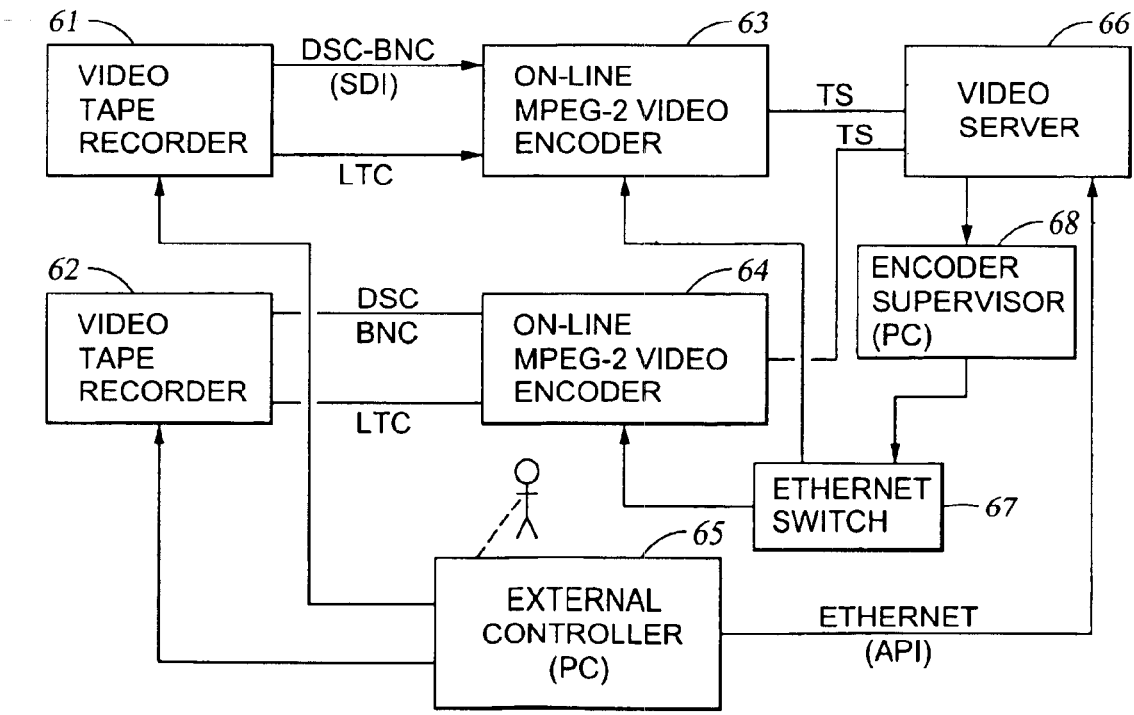
FIG. 8 is a block diagram of a fifth system for encoding and recording MPEG-2 encoded video data in accordance with the invention.

FIG. 8 shows a system similar to the system of FIG. 7. The system in FIG. 8 has several VTRs 61, 62 and on-line MPEG-2 video encoders 63, 64 that are controlled by one external controller PC 65 to allow concurrent recordings in a video server 66. The video server controls the video encoders 63, 64 through an Ethernet switch 67. In this case, however, the video encoders do not provide an interface compliant with the encoder control protocol used by the video server 66. Therefore, an encoder supervisor PC 68 is inserted in the Ethernet link between the video server 66 and the Ethernet switch 67. The encoder supervisor PC 68 is programmed to translate commands from the video server 66 into the native protocol of the video encoders 63, 64.

FIGS. 7 and 8 show that each of the two on-line MPEG-2 video encoders (43, 54 in FIGS. 7 and 63, 64 in FIG. 8) provide a separate Transport Stream (TS) to the video server (56 in FIG. 7 and 66 in FIG. 8). However, it is possible for the two (or more) Transport Streams in each system to be multiplexed together in a single multiplexed Transport Stream (MPTS) sent to the video server. For example, multiple video encoders are often provided on a single shelf including a Transport Stream multiplexer. The MPTS can then be sent to the video server (56 or 66), for example, using either Digital Video Broadcast (DVB) Asynchronous Serial Interface (ASI), or Asynchronous Transfer Mode (ATM I/F).

Figure 9:
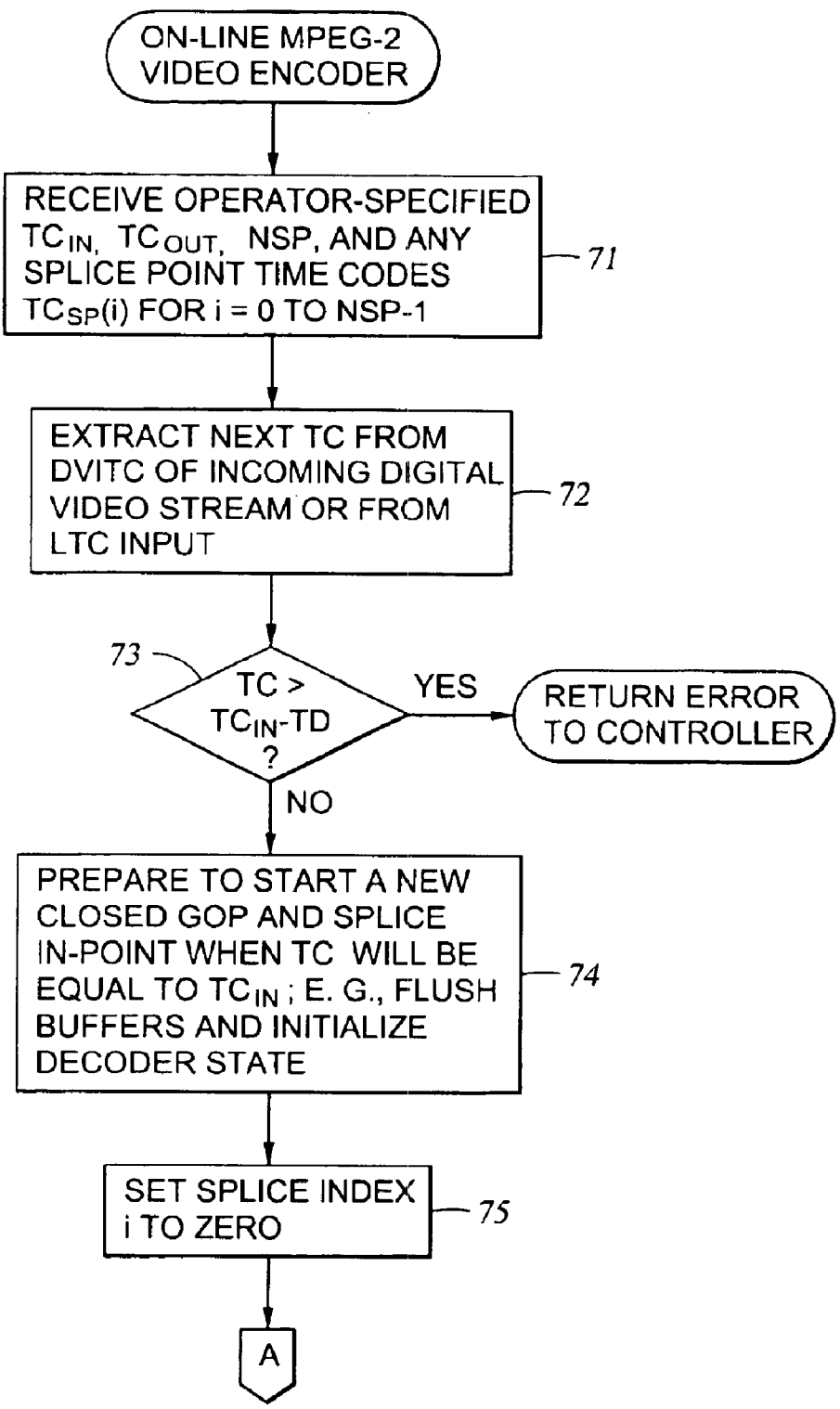
FIG. 9 is a first sheet of a flow chart for programming of an on-line MPEG-2 video encoder in accordance with the invention.

FIG. 9 is a first sheet of a flow chart for programming of an on-line MPEG-2 video encoder in accordance with the invention. In a first step 71, the video encoder receives operator-specified values for $TC_{IN}$, $TC_{OUT}$, a parameter NSP specifying zero or more splice points between $TC_{IN}$ and $TC_{OUT}$, and an array or list $TC_{SP}(i)$ of splice point time codes for i=0 to NSP-1. Next, in step 72, the video encoder extracts the next TC from the incoming digital video stream (VITC) or from the LTC input. In step 73, the extracted TC value is compared to the time code value $TC_{IN}$ minus a predetermined time offset TD sufficient for preparing the decoder to start a new closed GOP and splice-in point when TC will be equal to $TC_{IN}$. TD, for example, is a time code value representing a time interval of at least one frame. If the extracted TC value is greater than $TC_{IN}$–TD, then the video encoder returns an error to the external controller indicating that the time code $TC_{IN}$ is too small so that there is insufficient time to initialize the decoder, and the control procedure is finished and the splice point insertion fails. Otherwise, execution continues from step 73 to step 74.

In step 74, the video encoder prepares to start a new closed GOP and splice In-point when the extracted TC will be equal to $TC_{IN}$. For example, the video encoder flushes the audio and video buffers and initializes decoder state. The first audio presentation time stamp (PTS) will be synchronized with the first video PTS within one frame of audio. In step 75, the video encoder sets the splice index (i) to zero. Execution continues from step 75 to step 76 of FIG. 10.

Figure 10:
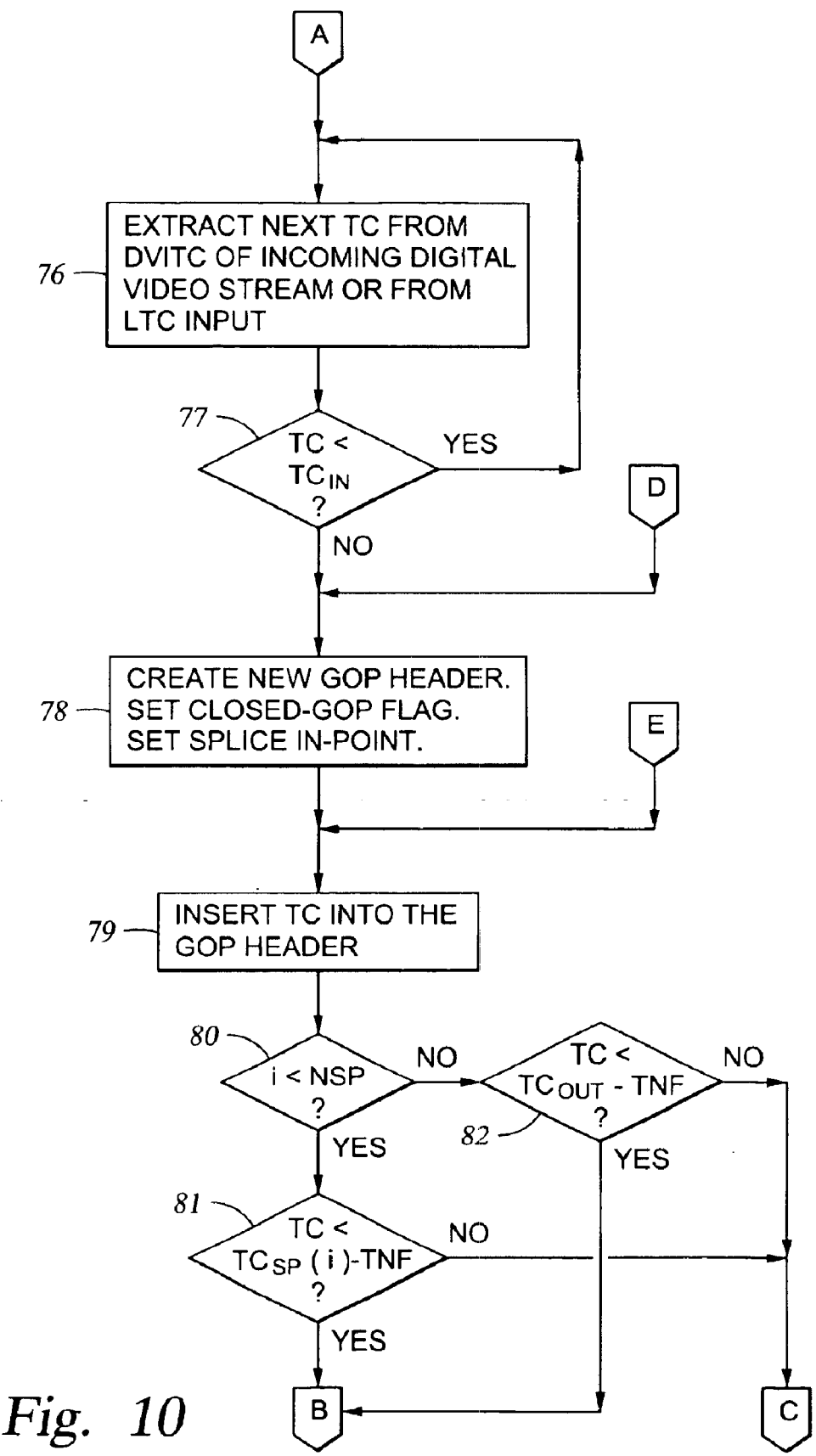
FIG. 10 is a second sheet of the flow chart begun in FIG. 9.

In step 76 of FIG. 10, the video encoder extracts the next TC from the incoming digital video stream or from the LTC input. In step 77, if the extracted TC is less than $TC_{IN}$, then execution loops back to step 76. Otherwise, once the specified In-point is reached ($TC=TC_{IN}$), execution continues from step 77 to step 78. In step 78, the video encoder creates a new GOP header, sets a CLOSED_GOP flag in the GOP header, and sets a splice In-point indicator in the GOP header. In step 79, the video encoder inserts the extracted TC value into the GOP header. For the first pass into step 79; this extracted TC value should be $TC_{IN}$. Then in steps 80 to 82, the video decoder determines whether the GOP should be either encoded normally in accordance with the closed GOP flag being either set or cleared (as is done in step 83 of FIG. 11), or encoded to end with a B or P frame splice Out-point (as is done in step 84 of FIG. 11). In particular, if the splice index (i) is less than the number of splice points (NSP), then execution continues to step 81. In step 81, the video encoder compares the extracted TC value to $TC_{SP}(i)$ minus TNF, where TNF is a predetermined time code value corresponding to the duration of the GOP. If the extracted TC value is less than $TC_{SP}(i)$ minus TNF, then the next splice point will not yet be reached by the end of the current GOP, and execution continues to step 83 of FIG. 11. If the extracted TC value is not less than $TC_{SP}(i)$ minus TNF, then the next splice point will be reached by the end of the current GOP, and execution continues to step 84 of FIG. 11.

If in step 80 the splice index (i) is not less than the number of splice points (NSP), then execution branches to step 82. In step 82, the video encoder compares the extracted TC value to $TC_{OUT}$ minus TNF. If the extracted TC value is less than $TC_{OUT}$ minus TNF, then the end of the clip will not yet be reached by the end of the current GOP, and execution continues to step 83 of FIG. 11. If the extracted TC value is not less than $TC_{OUT}$ minus TNF, then the next splice point will be reached by the end of the current GOP, and execution continues to step 84 of FIG. 11.

Figure 11:
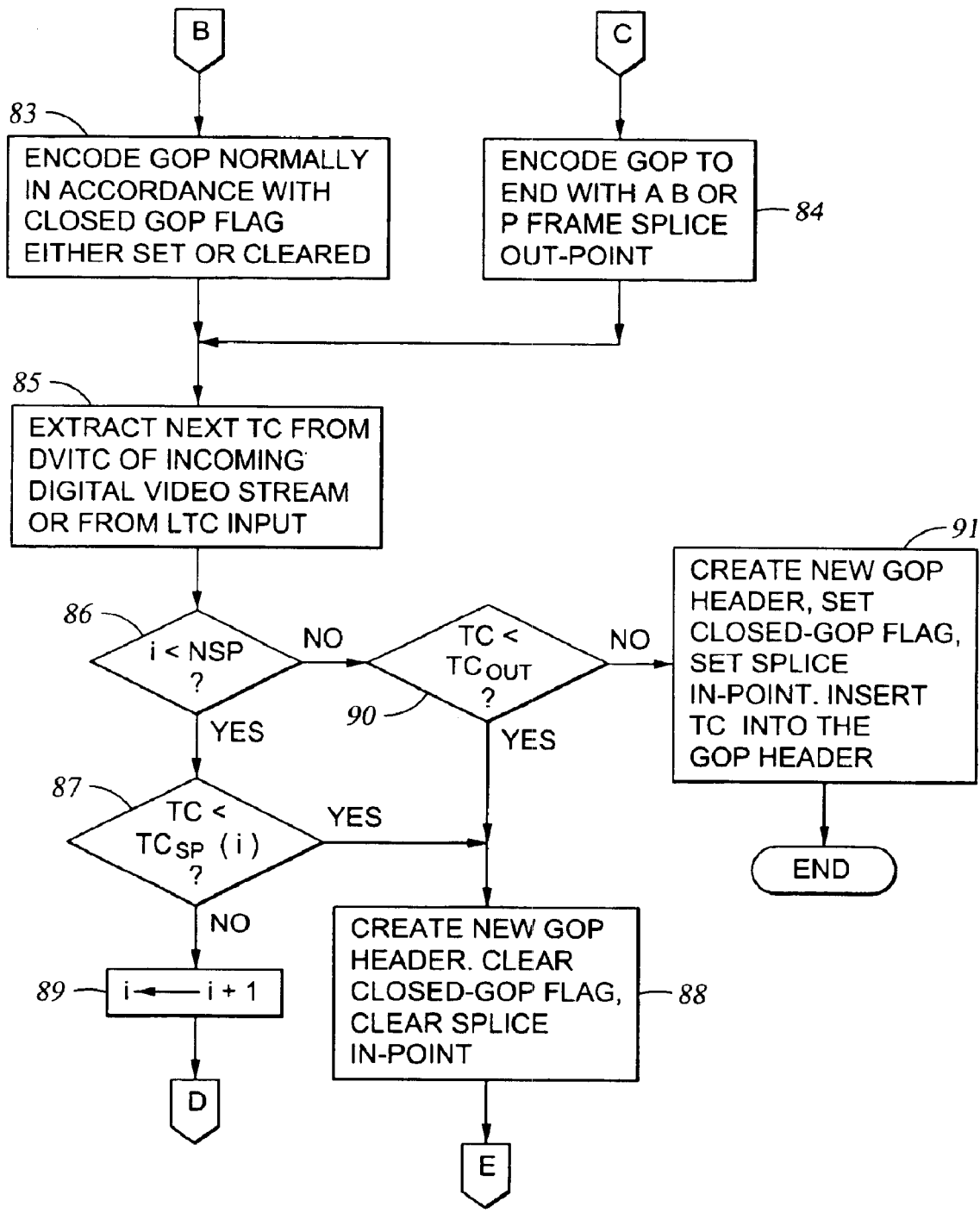
FIG. 11 is a third sheet of the flow chart begun in FIG. 9.

In step 83 of FIG. 11, the video encoder encodes the current GOP in the usual fashion in accordance with the closed GOP flag either set or cleared. In step 84 of FIG. 11, the video encoder encodes the GOP to end with a B or P frame splice Out-point. The objective here is to reduce the VBV video buffer level for splicing to a following closed GOP so as to avoid video buffer overflow during decoding of the following encoded video stream. It is also desired that the VBV video buffer level always be at least 10% of its maximum level corresponding to the encoding model so as to avoid video buffer underflow during decoding of the following encoded video stream. After step 83 or step 84, execution continues to step 85.

In step 85, the video encoder extracts the next TC from the incoming digital video stream or from the LTC input. Then, in step 86, the video encoder compares the splice index (i) to the number of splice points (NSP). If the splice index (i) is less than NSP, then there is at least one splice point from the array $TC_{SP}(i)$ yet to be included in the MPEG-2 encoded Transport Stream. In this case, execution continues to step 87 to check whether the first frame of the next GOP should be a splice In-point. In step 87, the extracted TC value is compared to $TC_{SP}(i)$. If the extracted TC value is less than $TC_{SP}(i)$, then the first frame of the next GOP should not be a splice In-point, and execution branches to step 88. In step 88, the video encoder creates a new GOP header, and clears the CLOSED_GOP flag and the splice In-point indication in the new GOP header. Execution then loops from step 88 back to step 79 in FIG. 10. In step 87, if the extracted TC value is not less than $TC_{SP}(i)$, then the next GOP should be a splice In-point, and execution continues to step 89. In step 89, the splice index (i) is incremented by one, and execution loops from step 89 back to step 78 of FIG. 10.

In step 86, if the splice index (i) is not less than NSP, then there are no splice points from the array $TC_{SP}(i)$ yet to be included in the MPEG-2 encoded Transport Stream. Execution branches from step 86 to 90, to check whether the end of the clip has been reached. In step 90, the video encoder compares the extracted TC value to $TC_{OUT}$. If the extracted TC is less than $TC_{OUT}$, then the end of the clip has not yet been reached, and execution continues to step 88. If TC is not less than $TC_{OUT}$, then the end of the clip has been reached, and execution branches to step 91. In step 91, the video encoder creates a new GOP header, and sets the CLOSED_GOP flag and the splice In-point indication in the GOP header. The video encoder also inserts the extracted TC value, which should be $TC_{OUT}$, in to the GOP header. Therefore, when the video server is recording the clip, it will find the $TC_{OUT}$ value in the GOP header and recognize that the clip has ended.

In a preferred implementation, it is desired that the video encoder would have some capabilities in addition to the capabilities apparent from the flowchart of FIGS. 9 to 11. For example, it is desired that the video encoder should be able to handle drop frames in the TC signal (for 29.97 fps). The video encoder should immediately synchronize an internal TC generator to the incoming TC signal whenever it becomes valid. In case this signal disappears, the video encoder would continue to insert its internally-generated TC into the GOP headers of the MPEG-2 encoded Transport Stream so that the TC drop remains transparent to the rest of the system. For splice points, it is desired that the splice point indicator in the GOP header (i.e., the splice_count_down value) should only be filled with 0 and −1. It is also desired that the video encoder will provide a substantially constant GOP size with variations less than 10% of the average size. It is further desired that any triggering information (of the kind received by the video encoder in step 71 of FIG. 9) should be forwarded to the video encoder at least one second before the actual triggering (by the appearance of the triggering condition in the incoming digital video stream). In addition to triggering by specified time codes, it is desired that the video encoder would respond to an application signal to end a current GOP immediately and begin a next closed GOP. This alternative triggering feature could also be used to terminate a clip after a requested number of frames after ending the current GOP immediately, or to insert a splice point after the repetition of a certain number of frames. In the video encoder control procedure of FIGS. 9–11, this alternative triggering feature could be implemented by counting frames in the incoming digital video stream, instead of comparing specified time code values to the TC signal in the incoming digital video stream or from the LTC input. It would also be desirable for the triggering to be performed on an LTC signal in addition to or instead of the DVITC in the incoming digital video stream. This would eliminate a need for an external LTC to DVITC converter in a case where the video source does not provide a trusted DVITC signal, such as in the situation described above with reference to FIG. 6.

Figure 12:
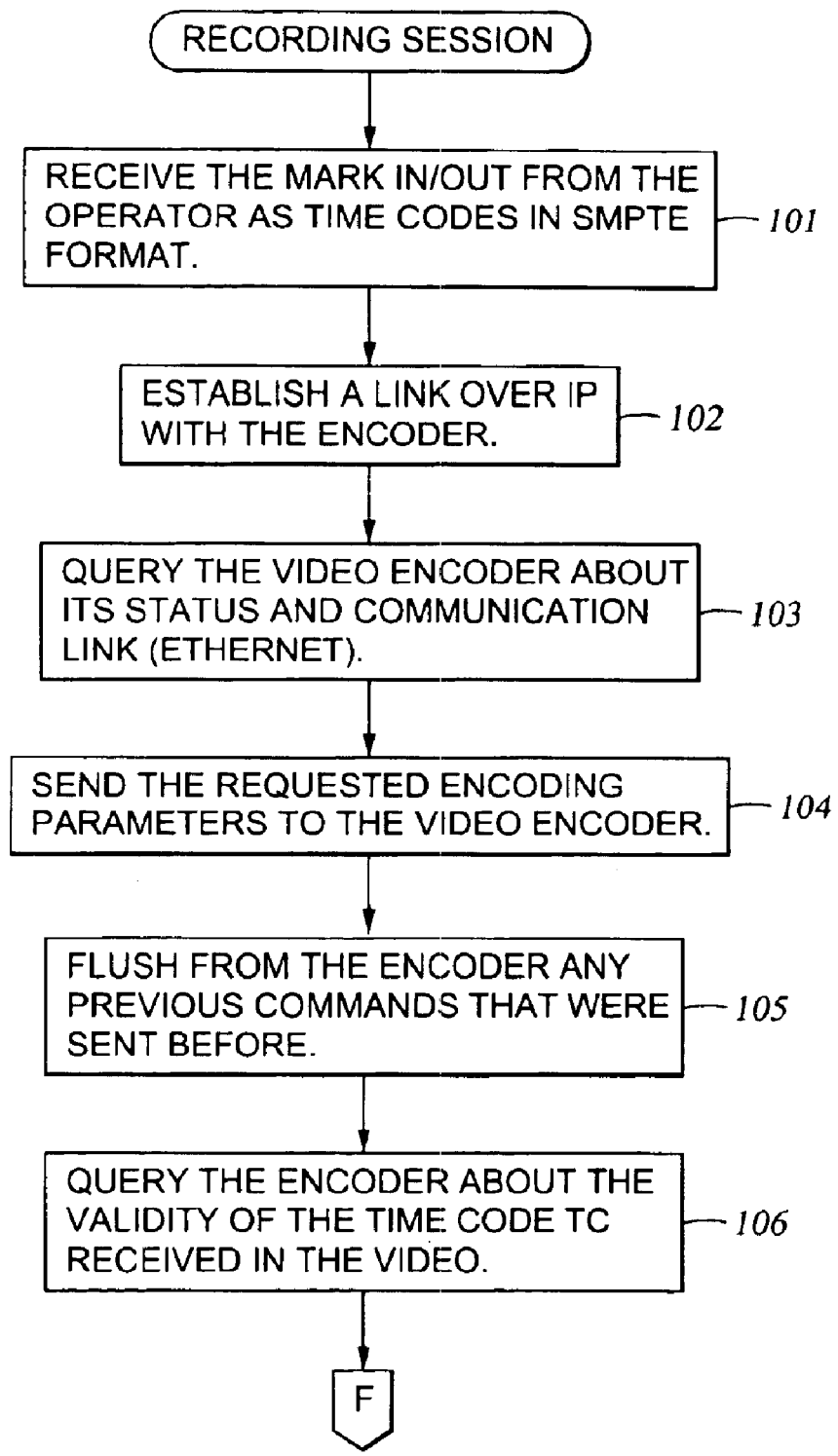
FIG. 12 is a first sheet of a flow chart of a method of using the system of FIG. 1.

FIG. 12 is a first sheet of a flow chart of a method of using the system of FIG. 1. This method is supervised by an application program in the external controller PC (24 in FIG.

1) although it would also be possible to program the video server 23 to supervise the method. In a first step 101, the system receives the Mark in and/or Mark out specification from the operator (25 in FIG. 1) as time codes in SMPTE format. In step 102, the system establishes a link over the Internet Protocol (IP) with the on-line MPEG-2 video encoder (22 in FIG. 1.) In step 103, the system queries the video encoder about its status and communication link (Ethernet). In step 104, the system sends the requested encoding parameters (including the specified operator-specified time codes) to the video encoder. In step 105, requested encoding parameters flush from the encoder any previous commands that were sent before. In step 106, the system queries the encoder about the validity of the Time Code TC received in the video. After step 106, the method continues in step 107 of FIG. 13.

Figure 13:
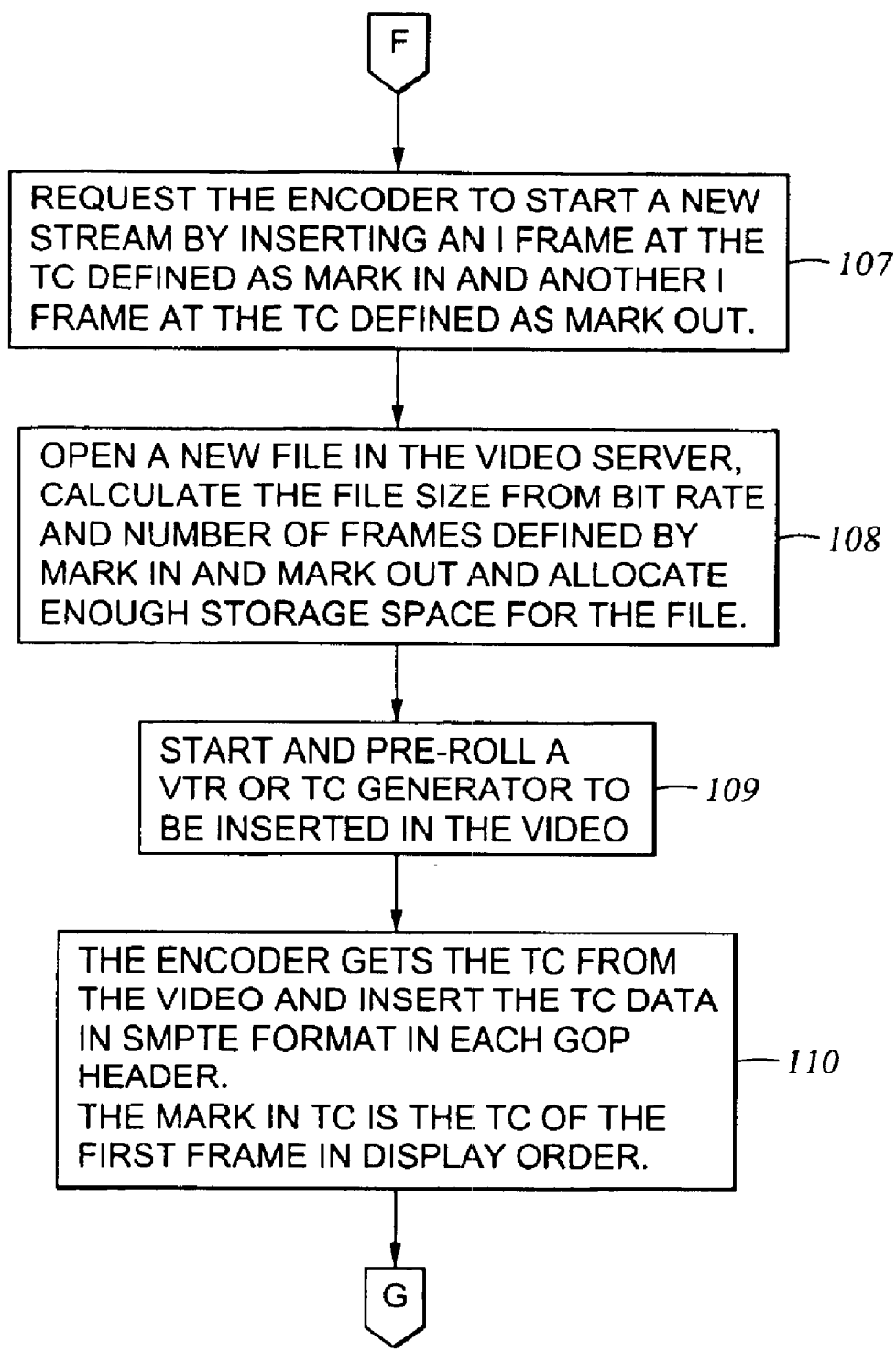
FIG. 13 is a second sheet of the flow chart begun in FIG. 12.

In step 107 of FIG. 13, the system requests the encoder to start a new stream by inserting an I frame at the TC defined as Mark in and another I frame at the TC defined as Mark out. In step 108, the system opens a new file in the video server, calculates the file size from the bit rate and number of frames defined by the Mark in and Mark out, and allocates enough storage space in the video file server for storage of the file. In step 109, the system starts and pre-rolls a VTR or TC generator to be inserted in the video. In step 110, the encoder gets the TC from the video or the LTC input and insert the TC data in SMPTE format in each GOP header. The Mark in TC is the TC of the first frame in display order. The method continues in step 111 of FIG. 14.

Figure 14:
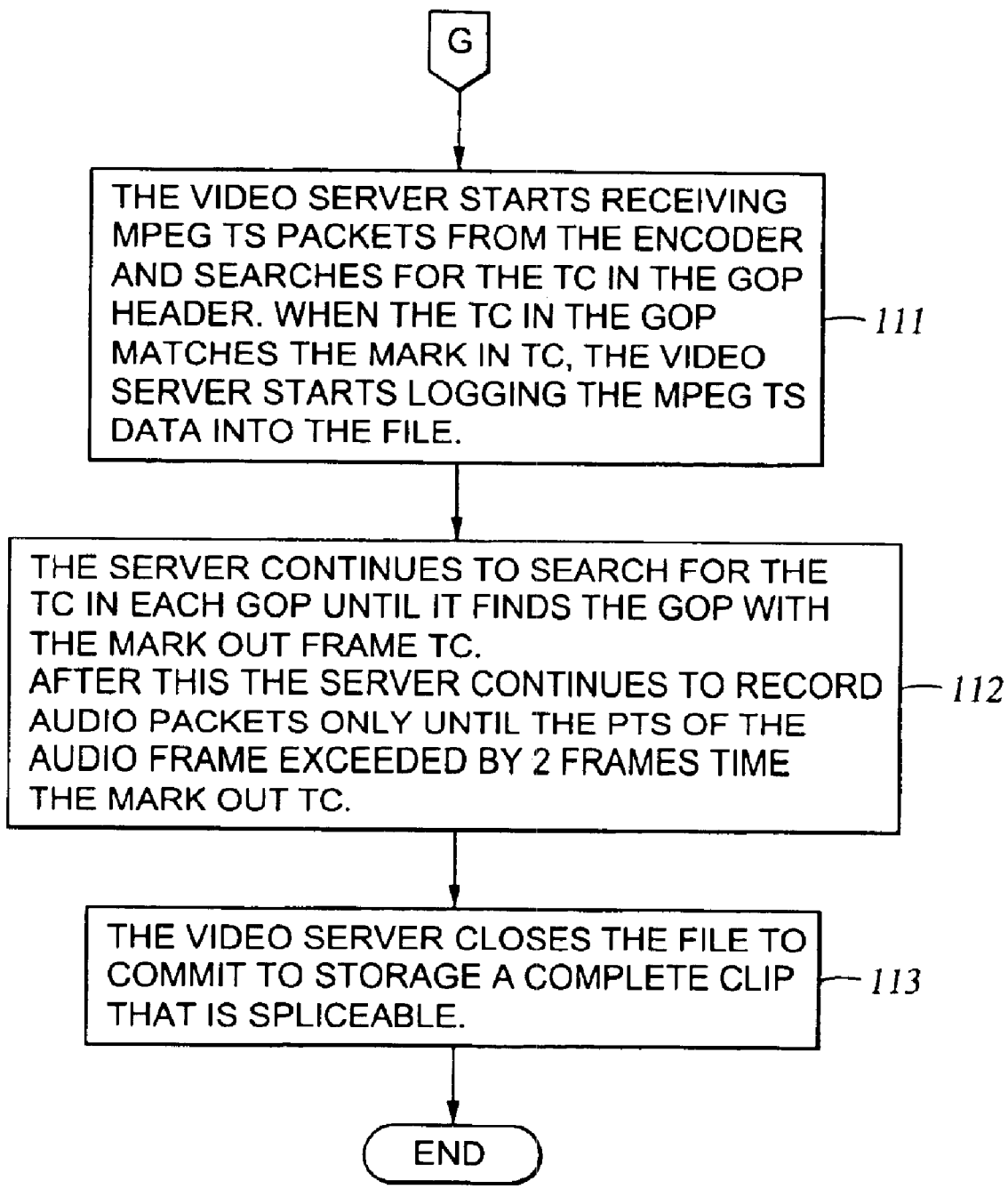
FIG. 14 is a third sheet of the flow chart begun in FIG. 12.
Figure 18A:
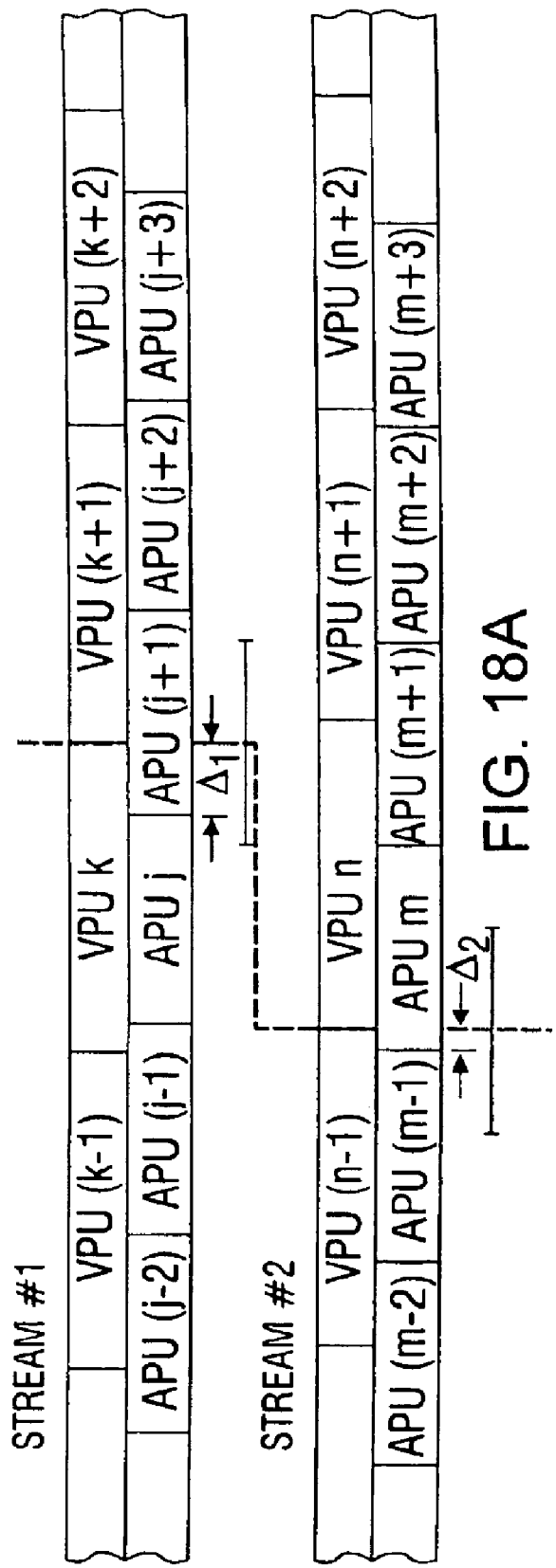
FIG. 18A is a diagram showing content of video and audio presentation unit streams for the two MPEG transport streams for a third case in the logic table of FIG. 15.
Figure 18B:
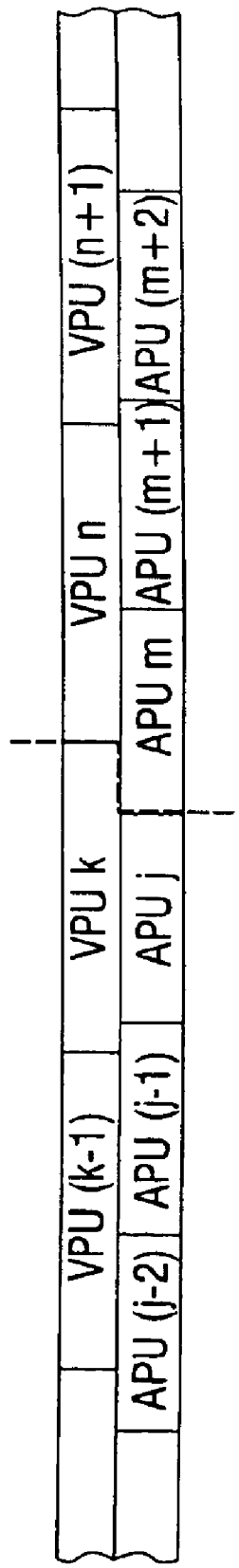
FIG. 18B is a diagram showing the content of video and audio presentation unit streams resulting from splicing of the two MPEG transport streams shown in FIG. 18A.
Figure 23A:
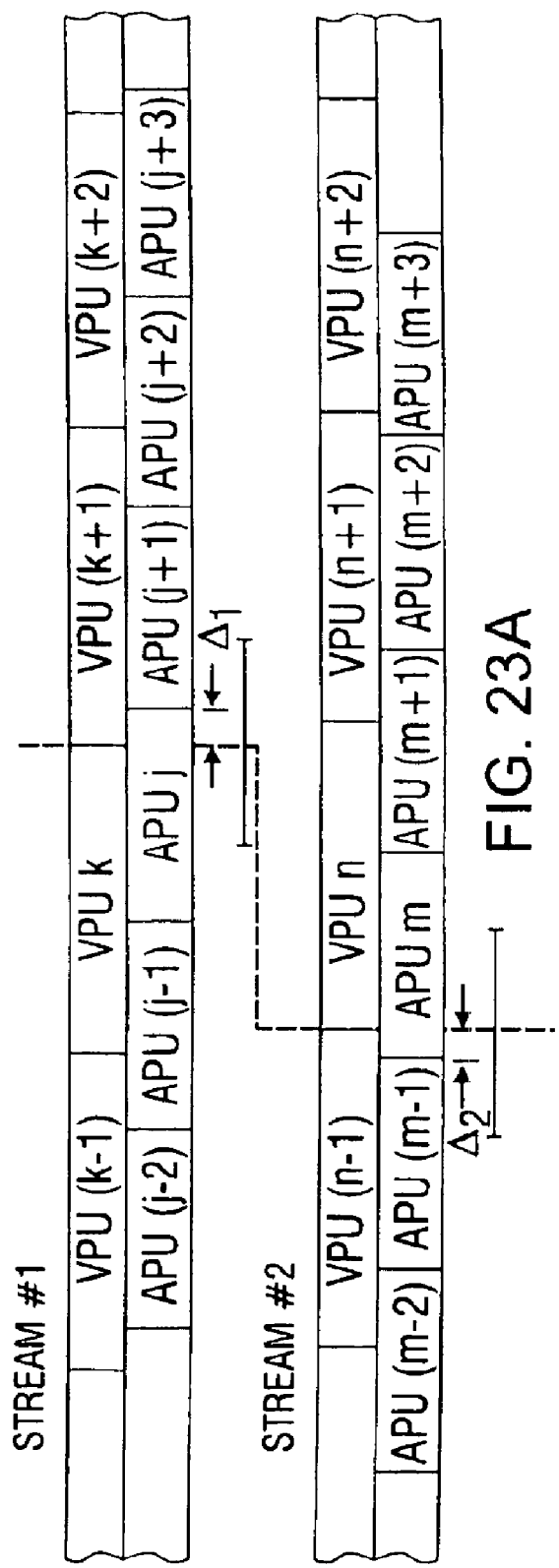
FIG. 23A is a diagram showing content of video and audio presentation unit streams for the two MPEG transport streams for an eighth case in the logic table of FIG. 15.
Figure 23B:
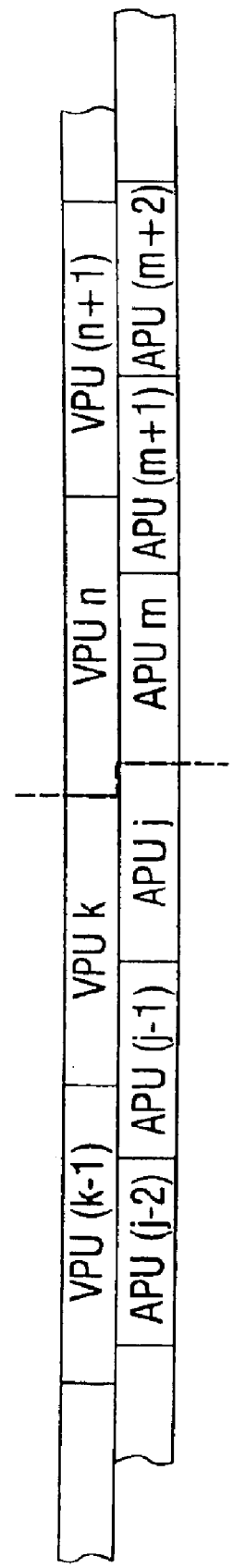
FIG. 23B is a diagram showing the content of video and audio presentation unit streams resulting from splicing of the two MPEG transport streams shown in FIG. 23A.

In step 111 of FIG. 14, the video server starts receiving MPEG TS packets from the encoder and collects the TS packets corresponding to each program in a multiple programs transport stream (MPTS) by using a demux procedure and searches for the TC in the GOP header of each program of the MPTS. Each program corresponds to an encoder channel of a pool of encoders. When the TC in the GOP matches the Mark in TC, the video server starts logging the MPEG TS data into the file. In step 112, the video server continues to search for the TC in each GOP until it finds the GOP with the Mark out frame TC. After this the server continues to record audio packets only until the presentation time stamp (PTS) of the audio frame exceeded by two frames time the Mark out frame TC and eliminates the video packets that are received after the last video frame corresponding to the Mark-out. Finally, in step 113, the video server closes the file to commit to storage a complete clip that is spliceable.

In a preferred implementation, the on-line MPEG-2 video encoder is controlled by remote procedure calls (RPCs) after an interface is set up to the video encoder using a standard RPC call such as "clntupd_create". The remote procedure calls include the following functions:

ecmp_getcapabilities_1

This function returns a description of the current configuration of encoders. For a single encoder it will return its kind. For a pool of encoders, the address and the kind of each encoder is returned.

emcp_s_getconfiguration_1

This function returns the configuration for a single encoder. The configuration is indicated by the current values for a set of encoding parameters. The encoding parameters include:

| | |
|---|---|
| profile | the profile |
| bool | set to true for a closed gop, false otherwise |
| tsbitrate | transport stream bitrate |
| videoinfo | video info |
| audioinfo | audio info in order (audio 1, audio 2, . . .) |
| pmtpid | pmt pid |
| pcrpid | pcr pid |
| framerate | frame rate |
| timecodeinsertion | How the timecode is retrieved by the encoder |
| videoinput | which video the encoder is receiving | ecmp_p_getconfiguration

This function returns the configuration of a specified encoder within the pool.

ecmp_s_getstatus_1

This function returns the encoders status code, availability, video state indicating whether or not the encoder is receiving a video signal, an audio state for each audio signal, and a time code status.

ecmp_p_getstatus_1

This function returns the status of a specified encoder within the pool.

ecmp_s_setmark_1

This function requests the single encoder to set a specified mark point.

ecmp_p_setmark_1

This function requests a specified encoder in the pool to set a specified mark point.

ecmp_s_setmarkinout_1

This function request the single encoder to set an "in" and an "out" point. The "in" point will start on the defined splice type. The "out" point will end the GOP.

ecmp_p_setmarkinout_1

This function requests a specified encoder in the pool to set an "in" and an "out" point.

ecmp_s_setperiodicmarks_1

This function requests the single encoder to set a mark for the first frame, the last frame, and each periodic frame. A periodic frame has its time code calculated as follows: for the first periodic frame, by adding the period time code to the first frame, and for the subsequent frames, by adding the period time code to the previous periodic frame, until the time code is greater or equal to the time code of the last frame.

ecmp_p_set_periodicmarks_1

This function requests a specified encoder in the pool to set a mark for the first frame, the last frame, and each periodic frame.

ecmp_s_setmarkslist_1

This function requests the single encoder to set each mark point in a list.

ecmp_p_setmarkslist_1

This function requests a specified encoder in the pool to set each mark point in a list.

ecmp_s_flushtimecodes_1

This function requests the single encoder to discard any previously defined mark point.

ecmp_p_flushtimecodes_1

This function requests a specified encoder in the pool to discard any previously defined mark point.

ecmp_s_setencodingparameters_1

This function requests the single encoder to configure itself with specified values for the encoding parameters ecmp_p_setencodingparameters_13 1

This function requests a specified encoder in the pool to configure itself with specified encoding values.

ecmp_s_sendgenericcommand_1

This function sends a specified ASCII string containing a vendor-specific command to the single encoder.

ecmp_p_sendgenericcommand_1

This function sends a specified ASCII string containing a vendor-specific command to a specified encoder in the pool.

ecmp_s_executecommandsfromfile_1

This function requests the single encoder to execute a batch file. This batch file is on the encoder. The batch operation will load a specified configuration file for a single encoder from the Ethernet network using TCP/IP control protocol.

ecmp_p_executecommandsfromfile_1

This function requests the specified encoder in the pool to execute a batch file. This batch file is on the specified encoder. The batch operation will load a specified configuration file for a pool of encoders from the Ethernet network using TCP/IP control protocol.

As described above with reference to step 112 of FIG. 14, the server continues to record audio packets after the GOP with the Mark out frame TC until the PTS of the audio frame exceeds by two frame times the Mark out TC. This is done so that the audio packets recorded after the Mark out TC will be available for seamless audio splicing. The preferred technique for seamless audio splicing is disclosed in the Daniel Gardere et al. U.S. Provisional Application Ser. No. 60/174,260, filed Jan. 4, 2000, entitled "Seamless Splicing of Encoded MPEG Video and Audio," pending as U.S. Non-Provisional Application Ser. No. 09/540,347 filed Mar. 31, 2000, incorporated herein by reference, and to be published as European Patent Application No. 00204717.3 filed 22 Dec. 2000. The subject matter in these Gardere et al. patent applications considered pertinent to practicing the present invention is shown in FIGS. 15 to 36 of the present application and is included in the following written description.

One problem with the splicing of MPEG transport streams is the elimination of any audio discontinuity at the splice point without causing an excessive or cumulative skew in the audio buffer level or in the alignment of the audio with the corresponding video. In general, there will be no alignment of the video presentation units (VPUs) and the audio presentation units (APUs) in the transport stream because the audio and video frame durations are substantially incommensurate. For example, an MPEG-2 TS encoding an NTSC television program with an audio sampling frequency of 48 kHz and audio bit rate of 192 kbits/sec will have a video frame duration (VPU) of 1/29.97 sec. and an audio frame duration (APU) of 24 msec. In this example, the start of a VPU will be aligned (in presentation time) with the start of an APU possibly at the beginning of a stream and then only at multiples of 5 minute increments in time. This implies that later they will not be aligned again for all practical purposes.

The splicing point between two MPEG-2 Transport Streams is naturally defined with respect to VPUs. The splicing point, for example, occurs at the end of the VPU for an Out Point (I or P frame) in the first TS, and at the beginning of the VPU for an In Point (I frame of a closed GOP) in the second TS. For splicing, the time base of the second TS is shifted to achieve video presentation continuity.

Because the audio access units (AAUs) are usually not aligned with the VPUs, there is an issue with respect to the selection of AAUs to be included in the spliced TS. In general, audio truncation (i.e., positioning of the cut with respect to the stream of AAUs in the first and second TS) should always be done at the AAU boundaries. Fractional AAUs are useless because the audio encoding algorithln is such that only whole AAUs can be decoded. Audio truncation for the ending stream should be done with respect to the end of its last VPU's presentation interval. Audio truncation for the beginning stream should be done relative to the beginning of its first VPU's presentation interval. These general rules, however, are insufficient to precisely specify which AAUs should be selected near the cut for inclusion in the spliced TS.

A more precise set of rules for selection of AAUs near the cut takes into consideration the concept of the "best aligned APU" and also takes into consideration the audio buffer level that would be expected in the beginning (i.e., second) stream absent splicing. The "best aligned final APU" of the ending (i.e., first) stream is defined as the APU whose presentation interval ends within one APU interval centered about the time of the cut. The "best aligned initial APU" of the beginning (i.e., second) stream is defined as the APU whose presentation interval starts within one APU interval centered about the time of the cut. As shown in the logic table of FIG. 15, there are eight possible cases that can be identified in terms of the "best aligned final APU," the "best aligned initial APU," and the presence of an audio gap or an audio overlap with respect to these best aligned APUs after the alignment of the VPUs of first and second streams at the cut point.

In FIG. 15, the APU duration is assumed to be 24 msec only for illustrative purposes without loss of generality. The eight cases are shown in FIGS. 16A, 17A, 18A, 19A, 20A, 21A, 22A, and 23A, and corresponding splicing solutions are shown in FIGS. 16B, 16C, 17B, 18B, 19B, 20B, 21B, 22B, 22C, and 23B. FIGS. 16B and 16C show alternative solutions, and FIGS. 22B and 22C show alternative solutions. In FIGS. 16A to 23B, VPUk designates the VPU of the Out-Point, APUj designates the best aligned final APU, VPUn designates the VPU of the In-Point, and APUm designates the best aligned initial APU. Presentation time increases from left to right in the figures, and the bold dashed line is the cut line at which the beginning presentation time of VPUn becomes aligned with end presentation time of VPUk.

The decoding logic of FIG. 15 can be implemented in software instructions for computing delta values, where delta 1 is computed as the end of the presentation time of the last VPU of the first stream minus the presentation time of the end of the best aligned final APU of the first stream. The best aligned final APU can be found by computing such a delta for each APU in the first stream around the time of the cut, and selecting the APU having such a delta that is within plus or minus one-half of the APU interval. Delta 2 is computed as the beginning of the presentation time interval of the first VPU of the second stream minus the presentation time of the beginning of the best aligned initial APU of the second stream. The best aligned initial APU can be found by computing such a delta for each APU in the second stream around the time of the cut, and selecting the APU having such a delta that is within plus or minus one-half of the APU interval.

The decoding logic of FIG. 15 is acceptable when the expected mean audio buffer level would be neither high nor low in the second stream absent splicing (i.e., in the original form of the second stream). When such a mean audio buffer level would be high or low for the second stream, additional solutions may be appropriate, as will be described below with reference to FIGS. 27 to 35.

Except for the cases in FIGS. 16A and 22A, splicing involves truncating the first audio stream at the end of the best aligned final APU, and starting the second audio stream at the best aligned initial APU. The presentation time stamps of the best aligned initial APU and all following APUs from the second stream are re-stamped so that they follow next in sequence after the best aligned final APU. Since presentation time stamps are not provided for each AAU but rather specified in the header field of audio PES packets for the first AAU commencing in the payload of the PES packet, the above mentioned re-stamping is achieved by modifying only these specified presentation time stamps. Further processing is required at the elementary stream level for modifying the audio PES packet carrying the best aligned final APU, and modifying the audio PES packet carrying the best aligned initial APU. The audio PES packet carrying the best aligned final APU is modified by truncation of AAU data after the AAU associated with the best aligned final APU, and modifying the PES packet size (in the corresponding PES packet header field) accordingly. The audio PES packet carrying the best aligned initial APU is modified by deleting the AAU data preceding the AAU associated with the best aligned initial APU, and modifying the PES packet size (in the corresponding PES packet header field) accordingly. In addition, the audio PES packet carrying the best aligned initial APU and all subsequent audio PES packets are modified by re-stamping their PTS values to follow in sequence from the PTS value of the audio PES packet carrying the best aligned final APU. The cases in FIGS. 16A and 22A involve similar truncation and modification operations, but in these cases either an additional APU is included in between the best aligned APUs (case of FIG. 16A) or one of the best aligned APUs is omitted (case of FIG. 22A). For the eight cases of audio splicing identified in FIG. 15, it is possible to construct a spliced audio elementary stream with no holes and no audio PTS discontinuity. As a consequence, an audio/video skew in presentation time of magnitude at most half of an APU duration will be introduced following the cut point in the spliced stream. This audio splicing technique can be repeated any number of times with neither a failure to meet its structural assumptions nor a degradation in this audio/video skew performance. The A/V skews introduced by the multiple splices do not accumulate. Irrespective of the number of consecutive splices, the worst audio/video skew at any point in time will be half of the APU duration. At each splice point, at the termination of the APUs and VPUs of the first stream, the total audio and video presentation durations up to that point will be almost matching each other, i.e., |video_duration−audio_duration|<=(½) APU_duration. Therefore always the proper amount of audio data will be provided by the audio splicing procedure described above. The resulting audio stream is error-free and MPEG-2 compliant.

The audio and video elementary streams must be recombined around and following the splice point. This is conveniently done by reformatting of spliced Transport Stream around and following the splice point. The truncation of the final PES packet of the first audio stream will typically necessitate the insertion of some adaptation field padding into its last transport packet. The deletion of some AAU data from the beginning of the second audio stream's initial PES packet will typically necessitate the editing of at most two audio transport packets.

In any MPEG-2 Transport Stream, the audio bit rate, over the span of a few VAU durations, is substantially constant. The VAUs, however, are of varying sizes. Therefore the relative positions of VAUs and AAUs associated with VPUs and APUs almost aligned in time cannot be maintained constant. Almost always it is the case that the AAUs are significantly delayed with respect to the corresponding VAUs for which the decoded representations are almost synchronous. Therefore, splicing to achieve the solutions for the cases of FIGS. 16A to 23A also involves transport packet buffering and re-multiplexing. The delayed audio packets near the Out Point in the first TS stream are temporarily stored in a buffer when the first TS stream is truncated based on the VAU of the Out Point. Also, the spliced TS is reformatted by deletion of some obsolete audio packets at the beginning of the second stream around the In Point, and repositioning of some audio packets of the first stream just following the Out Point into the spliced TS.

Figure 24:
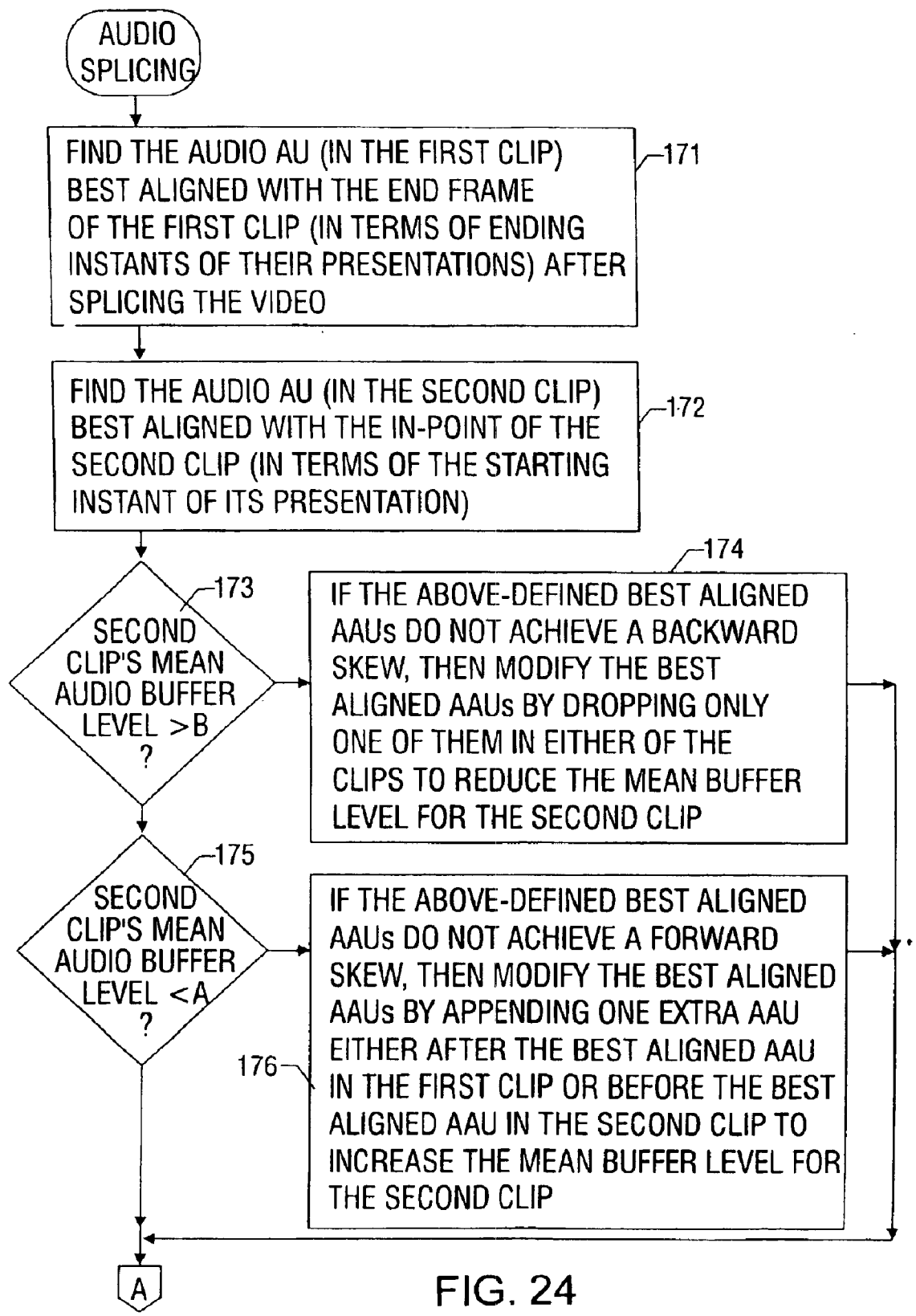
FIG. 24 is a first portion of a flow chart of a procedure for splicing audio streams.

With reference to FIG. 24, there is shown the beginning of a flow chart of an audio splicing procedure. In a first step 171, the procedure finds the audio access unit (AAU) of the first clip best aligned with the end frame of the first clip (in terms of the ending instants of their presentations) after splicing of the video. Then, in step 172, the procedure finds the audio access unit (AAU) of the second clip best aligned with the In Point of the second clip (in terms of the starting instant of its presentation). In step 173, for the second clip the mean audio buffer level, assuming no modification made for splicing, is compared to a high threshold, designated B. (B, for example, has a value of 66% of the audio buffer capacity.) If this mean audio buffer level exceeds the high threshold B, then the procedure branches to step 174. In step 174, if the above-defined best aligned AAUs do not achieve a backward skew, then the best aligned AAUs are modified by dropping only one of them in either of the clips to reduce the mean audio buffer level for the second clip. In step 173, if the mean audio buffer level does not exceed the high threshold B, then execution continues to step 175. In step 175, the mean audio buffer level for the second clip, assuming no modification made for splicing, is compared to a low threshold, designated A. (A, for example, has a value of 33% of the audio buffer capacity.) If this mean audio buffer level is less than the low threshold A, then the procedure branches to step 176. In step 176, if the above-defined best aligned AAUs do not achieve a forward skew, then the best aligned AAUs are modified by appending only one extra AAU either after the best aligned AAU in the first clip or before the best aligned AAU in the second clip to increase the mean audio buffer level for the second clip.

In general, a forward skew of the AAUs from the second stream by incrementing their presentation time instants tends to increase the mean audio buffer level. Therefore, a forward skew is good if the mean audio buffer level is low for the second stream. A backward skew of the AAUs from the second stream by decrementing their presentation time instants tends to decrease the audio buffer level. Therefore, a backward skew is good if the mean audio buffer level is high for the second stream.

Figure 25:
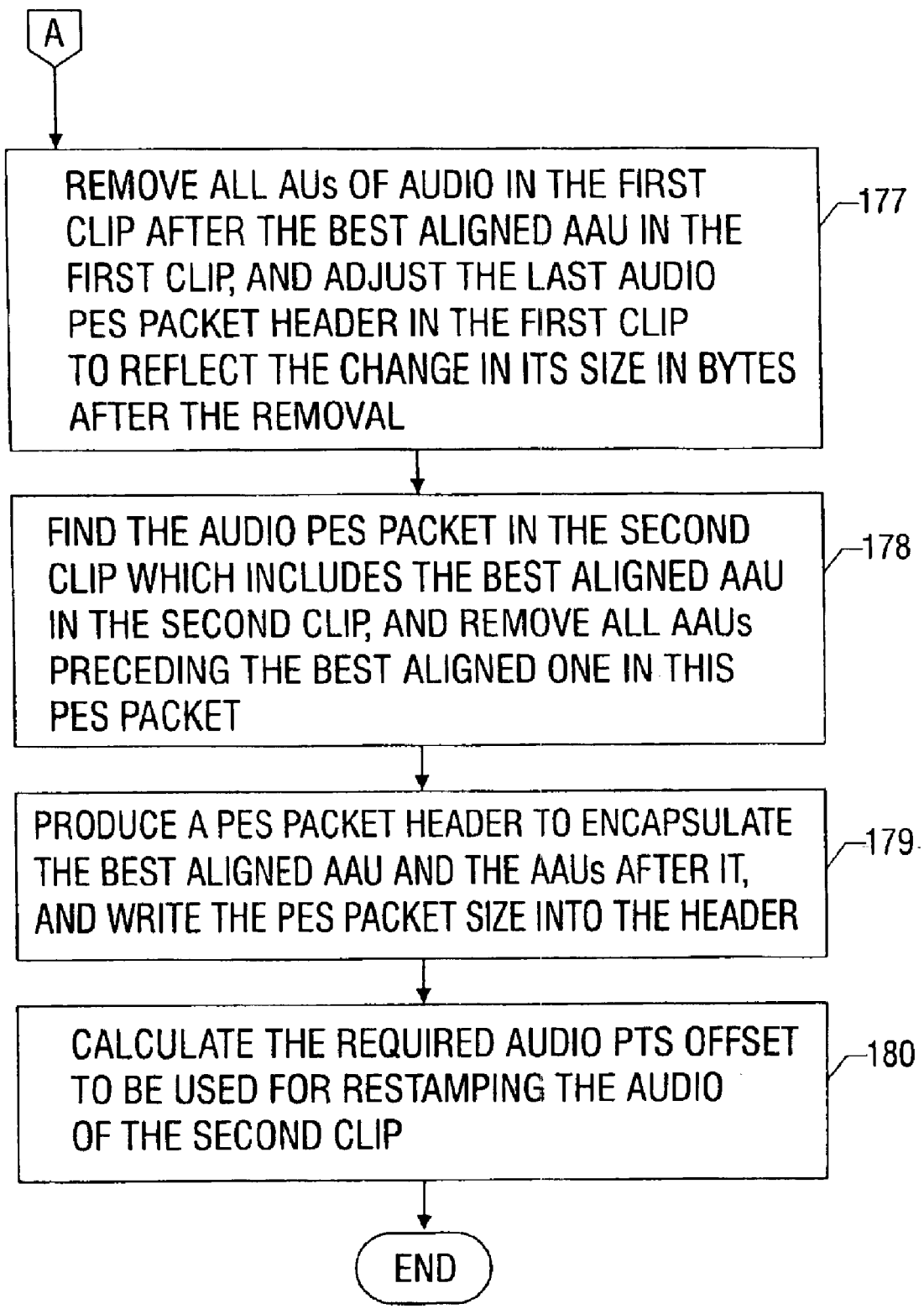
FIG. 25 is a second portion of the flow chart begun in FIG. 24.
Figure 27:
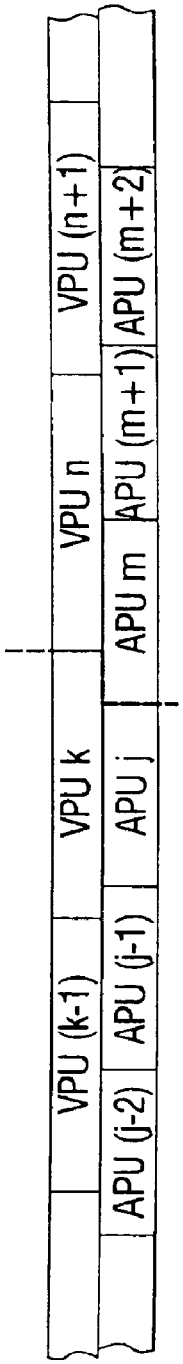
FIG. 27 shows how the first and second clips for the case of FIG. 16A should be spliced when the second clip has a high mean audio buffer level.
Figure 28:
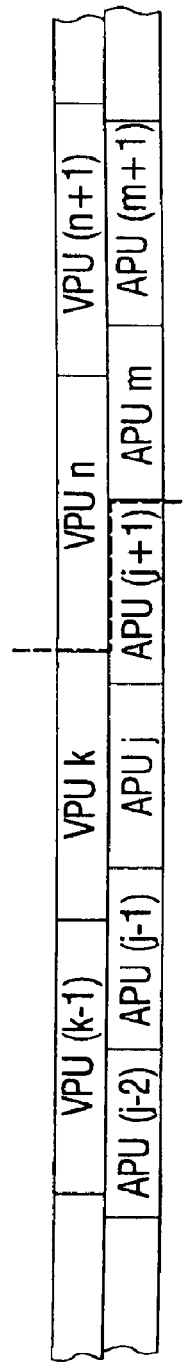
FIG. 28 shows how the first and second clips for the case of FIG. 17A should be spliced when the second clip has a low mean audio buffer level.
Figure 29:
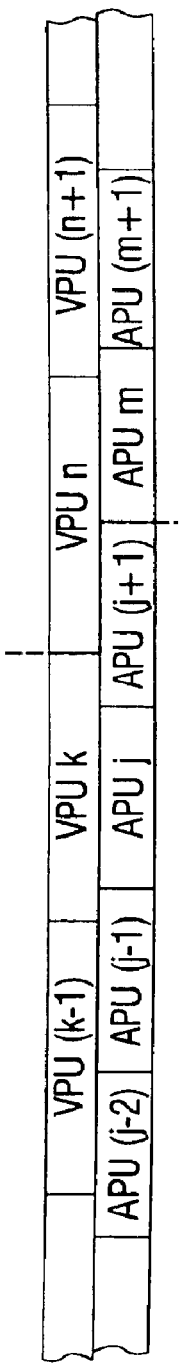
FIG. 29 shows how the first and second clips for the case of FIG. 18A should be spliced when the second clip has a low mean audio buffer level.
Figure 30:
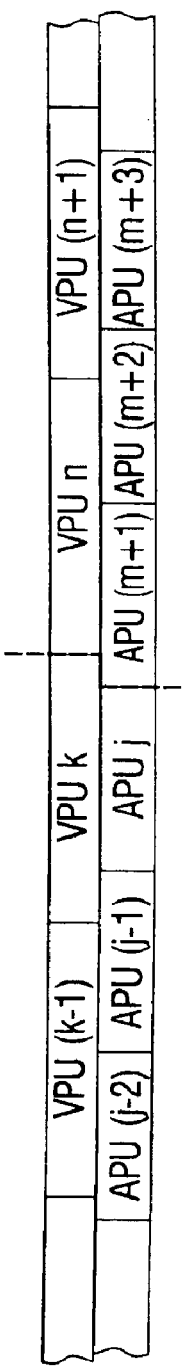
FIG. 30 shows how the first and second clips for the case of FIG. 19A should be spliced when the second clip has a high mean audio buffer level.
Figure 31:
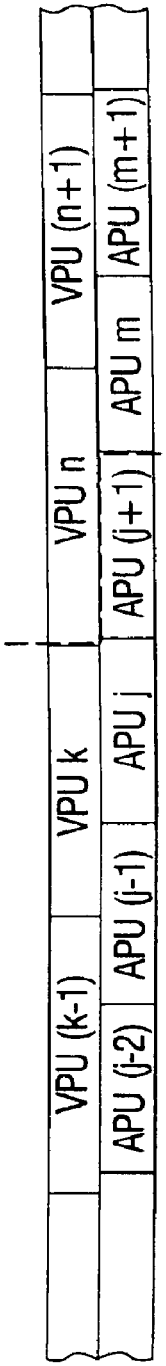
FIG. 31 shows how the first and second clips for the case of FIG. 20A should be spliced when the second clip has a low mean audio buffer level.
Figure 32:
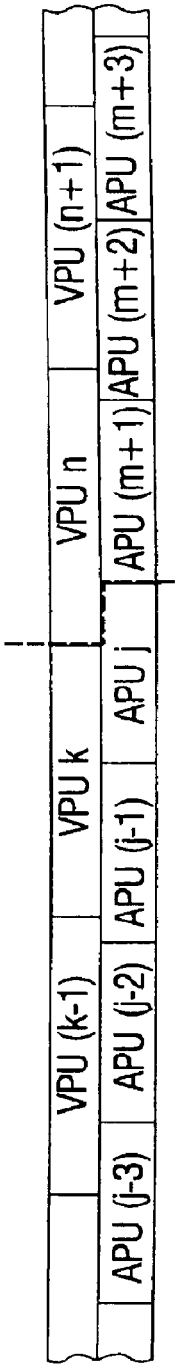
FIG. 32 shows how the first and second clips for the case of FIG. 21A should be spliced when the second clip has a high mean audio buffer level.
Figure 33:
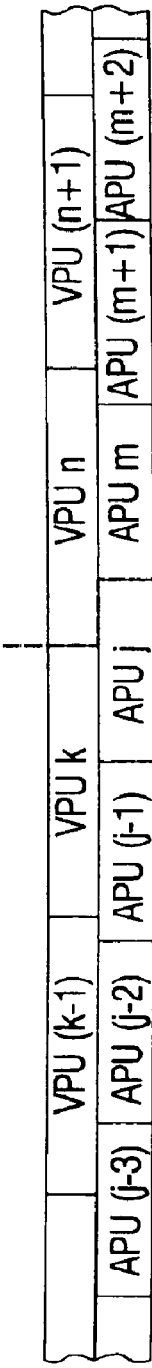
FIG. 33 shows how the first and second clips for the case of FIG. 22A should be spliced when the second clip has a low mean audio buffer level.
Figure 34:
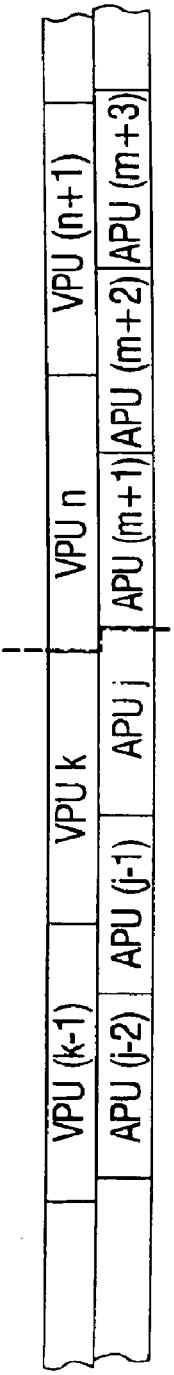
FIG. 34 shows how the first and second clips for the case of FIG. 23A should be spliced when the second clip has a high mean audio buffer level.
Figure 35:
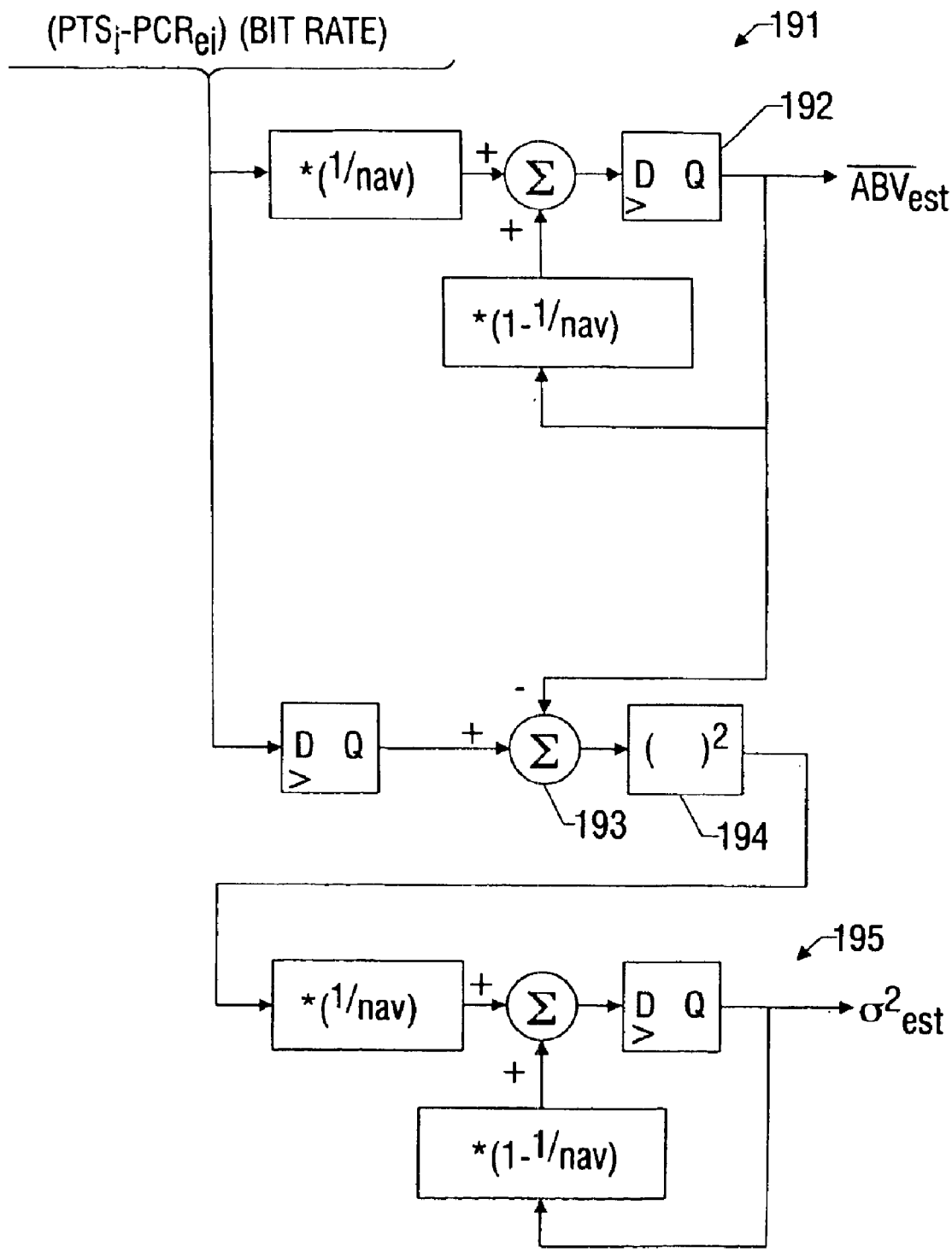
FIG. 35 is a schematic diagram of a digital filter for estimating the average audio buffer level and standard deviation of the audio buffer level from presentation time stamps (PTS) and extrapolated program clock reference (PCR) time stamps for an audio elementary stream.

In step 175, if the mean audio buffer level is not less than the low threshold A, then the procedure continues to step 177 in FIG. 25. The procedure continues to step 177 also after steps 174 and 176. In step 177, the procedure removes all AAUs in the first clip after the best aligned AAU in the first clip, and adjusts the last audio PES packet header in the first clip to reflect the change in its size in bytes after the removal. In FIG. 25, step 178, the procedure finds the audio PES packet in the second clip which includes the best aligned AAU in the second clip, and removes all AAUs preceding the best aligned one in this PES packet. Then in step 179, the procedure produces a PES packet header to encapsulate the best aligned AAU and the AAUs after it, and writes the PES packet size into the header. Finally, in step 180, the procedure calculates the required audio PTS offset ($A_{offset}$) to be used for re-stamping the audio of the second clip.

The preferred implementation of the audio splicing routine in FIGS. 24 and 25 uses the logic shown in FIG. 26. Depending on whether the mean audio buffer level for the second clip, assuming no modifications are made for splicing, is greater than the high threshold B or less than the low threshold A, the eight cases of FIG. 15 are expanded to sixteen cases. The preferred solutions for these eight additional cases are shown in FIGS. 27 to 34. When the mean audio buffer level for the second clip, assuming no modifications are made for splicing, is neither greater than the high threshold B nor less than the low threshold A, then the solutions shown in FIGS. 16 to 23 are immediately applicable.

A preferred method of estimating the mean audio buffer level of a clip is to use the product ($PTS_i$–$PCR_{ei}$)(BIT RATE) as an indication of the audio buffer level. $PTS_i$ denotes the ith audio PTS time stamp, and $PCR_{ei}$ denotes the PCR value extrapolated to the bit position of $PTS_i$. Because the product ($PTS_i$–$PCR_{ei}$)(BIT RATE) will fluctuate more rapidly than the mean audio buffer level, the computed values may be processed by a simple digital filter routine to obtain an estimated value of the mean audio buffer level at any point of a clip. Shown in FIG. 35, for example, is a digital filter schematic that includes a single first-order recursive stage 191 for computing an estimate of the mean audio buffer level ABV. The computation includes a scaling of ($PTS_i$–$PCR_{ei}$)(BIT RATE) by a factor of $1/n_{av}$, where $n_{av}$ is the effective number of samples over which the mean is estimated. The scaled value is added to the previous estimate of the mean value of ABV scaled by a "forgetting factor" of $1-1/n_{av}$. The previous value is stored in a register 192. In a similar fashion, an estimate of the variance of the audio buffer level at any point of a clip is computed by similar circuitry or computations depicted in FIG. 36. For example, the estimate of the variance can be computed by a subtractor 193 that calculates the deviation of each sample of ($PTS_i$–$PCR_{ei}$)(BIT RATE) from the estimated mean audio buffer level, a squaring unit 194, and another first-order recursive filter stage generally designated 195.

Figure 36:
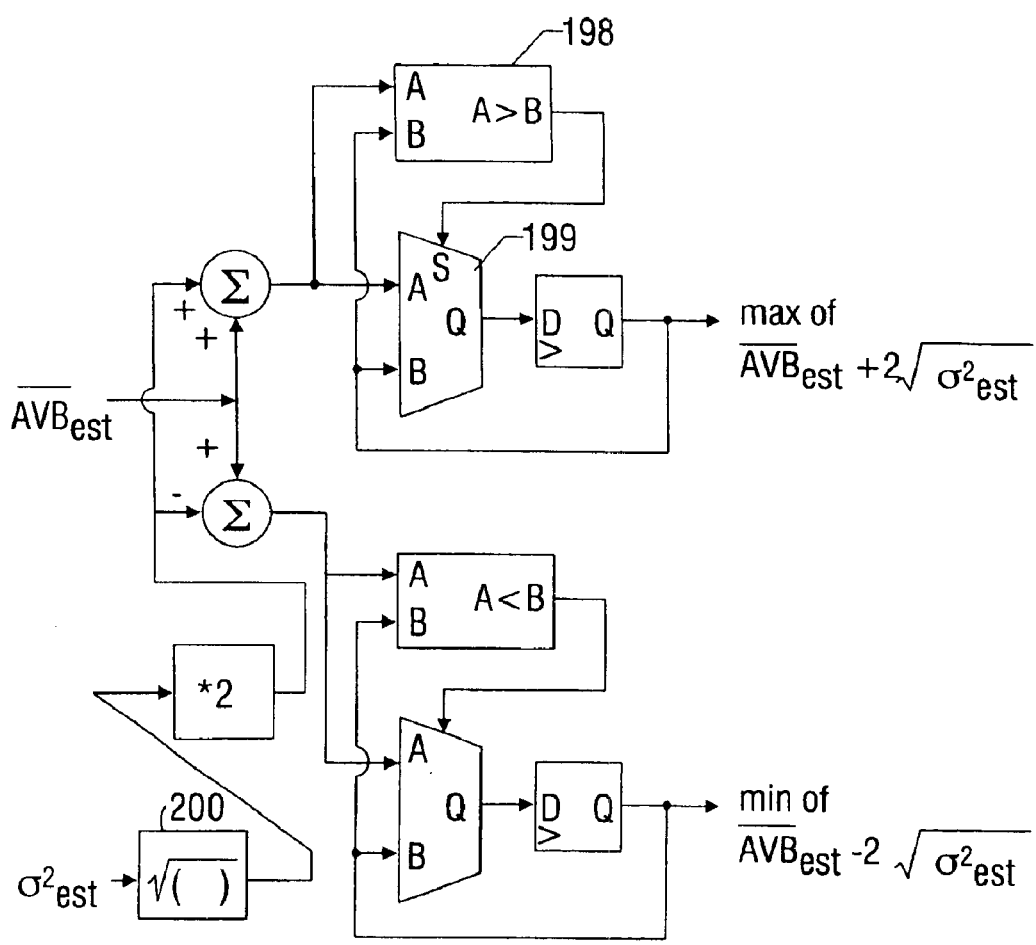
FIG. 36 is a schematic diagram of circuitry for computing an expected maximum and an expected minimum audio buffer level from the estimated average audio buffer level and standard deviation of the average audio buffer level from the digital filter circuitry in FIG. 35.

Instead of determining whether the mean audio buffer level is relatively high or low for a clip, a determination can be made as to whether the audio buffer full level (i.e., audio buffer size) is within a certain number of estimated standard deviations from the estimated mean audio buffer level, or whether the audio buffer empty level (e.g., zero bytes) is within a certain number of estimated standard deviations from the estimated mean audio level. In this case, the certain number can be selected based on the usual statistics of the type of audio encoding that is employed, in order to ensure the absence of audio buffer underflow or overflow within a desired level of confidence. In order to make the comparisons very simple at the time of splicing, the maximum and minimum expected deviations from the estimated average can be computed in advance for each clip. For example, FIG. 36 shows in schematic form the computations necessary to compute the maximum of the estimated mean buffer level AVB plus twice the estimated standard deviation, and to compute the minimum of the estimated mean buffer level AVB minus twice the standard deviation. The box 198, for example, outputs a binary value indicating whether or not the input A is greater than the input B. The symbol 199 denotes a multiplexer or selection step. The symbol 200 denotes a square root operator block. The other symbols in FIG. 36 have meanings similar to the like symbols in FIG. 35.

To simplify audio buffer management during splicing transients, it is recommended to have the same audio buffer levels at the beginning and at the end of the clips. The case of going from a low to a high audio buffer level is the most problematic, and is addressed by a sufficiently precise mean buffer level estimate for beyond the selected In Point.

If there are multiple audio streams for one program, then all of these individual audio streams are processed independently in the fashion described above for a single stream. For example, there could be two stereo audio streams for one program, or four audio streams for quadraphonic sound. The association of the ending (i.e., first) clip and starting (i.e., second) clip audio streams to splice together depends on the PID of the streams after PID re-mapping, if there is PID re-mapping, or on the PID of each stream in the spliced clips, if there is no PID re-mapping. For an audio stream of the ending clip that has no audio stream in the starting clip that can be associated with it, the preserved audio packets are played until the end. This will achieve the best possible alignment between audio and video for the ending clip.

In view of the above, there has been provided a system and method in which an on-line MPEG-2 video encoder is controlled so that the group-of-picture (GOP) structure in the encoder provides specified In-points and Out-points that are valid and desirable for splicing. The video encoder produces an MPEG-2 coded Transport Stream from an incoming digital video stream. The video encoder extracts time codes (TC) from the digital video stream or from an LTC input and inserts the time codes in the GOP headers in MPEG-2 coded Transport Stream. The video encoder compares the time codes to time codes for operator-specified Mark-in and Mark-out points in order to encode the Mark-in frame as the first I frame of a closed GOP and to terminate a GOP with an Out-point frame just prior to the Mark-out point. A video server receiving the MPEG-2 coded Transport Stream compares the time codes in the GOP headers to the operator-specified Mark-in and Mark-out time codes to begin and terminate processing of a clip, such as beginning and terminating the recording of the clip in storage of the video server. The video encoder may also receive a list of additional operator-specified splice points. A GOP is terminated just prior to each splice point and a new closed GOP is begun at each splice point. The video server or an external controller can use an encoder control protocol in order to specify the Mark-in, Mark-out, and additional splice points and monitor the encoder status.

It should be apparent that the forms of the invention shown in the drawings can be modified in various ways without departing from the claimed invention. For example, in the above description, the operator has specified the end of a clip to be recorded by input of a time code $TC_{OUT}$ for the frame immediately preceding, in display order, the last frame to be displayed in the clip. The operator could just as easily have inputted the time code of the last frame to be displayed in the clip, and the external controller or the on-line MPEG-2 video encoder could have calculated the time code $TC_{OUT}$ by adding a time code offset corresponding to the increase in time for the presentation of one frame. Due to the fact that the frame rate is a predetermined constant for each MPEG-2 stream, the time code of the last frame to be displayed in the clip can be used as a specification of the time code for the immediately following frame in the MPEG-2 Transport Stream. Conversely, the time code for the immediately following frame in the MPEG-2 Transport Stream can be used as a specification for the time code of the last frame to be displayed in the clip.

What is claimed is:

1. A method of operating an on-line MPEG video encoder during real-time encoding of an incoming video stream to produce an MPEG Transport Stream, the incoming video stream having video frames, the video frames having respective time codes, said method comprising:

the on-line MPEG video encoder comparing the time codes of video frames in a first portion of the incoming video stream to a first time code specification to locate, in the incoming video stream, a first video frame having a time code specified by the first time code specification, and the on-line MPEG video encoder starting a new closed group of pictures (GOP) in the MPEG Transport Stream including the first video frame encoded as a first I frame of the new closed GOP, and the on-line MPEG video encoder comparing the time codes of video frames in a second portion of the incoming video stream to a second time code specification to identify, in the incoming video stream, a second video frame having a time code specified by the second time code specification, and the on-line MPEG video encoder terminating a GOP in the MPEG transport stream to produce a terminated GOP, the terminated GOP having a last video frame immediately preceding the second video frame.

2. The method as claimed in claim 1, wherein the time codes of the video frames in the incoming video stream are time codes included in the incoming video stream, and the on-line MPEG video encoder extracts the time codes from the incoming video stream.

3. The method as claimed in claim 1, wherein the time codes of the video frames in the incoming video stream are longitudinal time codes, the on-line MPEG video encoder obtains the video stream from a video stream input, and the on-line MPEG video encoder obtains the longitudinal time codes from a longitudinal time code input.

4. The method as claimed in claim 1, which further includes the on-line MPEG video encoder inserting the time code for the first video frame in a header of the new closed GOP in the MPEG Transport Stream, and the on-line MPEG video encoder inserting the time code for the second video frame in a header for a GOP in the MPEG Transport Stream immediately following the terminated GOP.

5. The method as claimed in claim 4, which further includes a video server receiving the MPEG Transport Stream and searching the MPEG Transport Stream for the time code of the first video frame and searching the MPEG Transport Stream for the time code of the second video frame in order to store a clip of video frames including the new closed GOP and the terminated GOP and GOPs between the new closed GOP and the terminated GOP.

6. The method as claimed in claim 1, which includes the MPEG video encoder terminating the terminated GOP with a B or P frame to produce a splice Out-point.

7. The method as claimed in claim 1, which includes the MPEG video encoder producing an open GOP immediately following the new closed GOP.

8. The method as claimed in claim 1, which further includes the video encoder searching for video frames in the incoming video that have the time codes specified by time code specifications in a list of time code specifications for splice points in order to encode closed GOPs having initial I frames in the MPEG Transport Stream for each of the splice points.

9. A method of operating an on-line MPEG video encoder during real-time encoding of an incoming video stream to produce an MPEG Transport Stream, said method comprising:

the on-line MPEG video encoder comparing time codes of video frames in the incoming video stream to a list of time code specifications for splice points, and upon finding a time code in the incoming video stream specified by a time code specification for a splice point in the list, the on-line MPEG video encoder starting a new closed group of pictures (GOP) in the MPEG Transport Stream, the new closed GOP including a video frame having the time code specified by the specification for the splice point in the list, and the video frame having the time code specified by the specification for the splice point in the list being encoded as a first I frame of the new closed GOP.

10. The method as claimed in claim 9, wherein the time codes of the video frames in the incoming video stream are time codes included in the incoming video stream, and the on-line MPEG video encoder extracts the time codes from the incoming video stream.

11. The method as claimed in claim 9, wherein the time codes of the video frames in the incoming video stream are longitudinal time codes, the on-line MPEG video encoder obtains the video stream from a video stream input, and the on-line MPEG video encoder obtains the longitudinal time codes from a longitudinal time code input.

12. The method as claimed in claim 9, which further includes the on-line MPEG video encoder inserting the time code specified by the specification for the splice point in the list into a header for the new closed GOP in the MPEG Transport Stream.

13. The method as claimed in claim 9, wherein the new GOP is immediately preceded by a terminated GOP, and wherein the method includes the on-line MPEG video encoder terminating the terminated GOP with a B or P frame to produce a splice Out-point.

14. A method of operating an on-line MPEG video encoder and a video server, the on-line MPEG video encoder encoding in real time an incoming video stream to produce an MPEG Transport Stream, the video server receiving the MPEG Transport Stream and recording a segment of the MPEG Transport Stream as a clip, the incoming video stream including video frames, the video frames having respective time codes, said method comprising:

the on-line MPEG video encoder comparing the time codes of video frames in a first portion of the incoming video stream to a time code specification for a first video frame to be included in the clip in order to locate, in the incoming video stream, a first video frame to be included in the clip, and the on-line MPEG video encoder starting a new closed group of pictures (GOP) in the MPEG Transport Stream, the new closed GOP including the first video frame to be included in the clip as a first I frame of the new closed GOP, and the on-line MPEG video encoder comparing the time codes of video frames in a second portion of the incoming video stream to a time code specification for a last video frame to be included in the clip in order to locate, in the incoming video stream, the last video frame to be included in the clip, and the on-line MPEG video encoder terminating a GOP in the MPEG transport stream to produce a terminated GOP encoding the last video frame to be included in the clip as the last video frame in the terminated GOP; and the on-line MPEG video encoder inserting, in a GOP header for each GOP in the transport stream, a time code of at least the first video frame to be displayed from the GOP; and the video server searching the time codes in the GOP headers in the MPEG Transport Stream to locate the first video frame to be included in the clip and to record the clip in storage of the video server.

15. The method as claimed in claim 14, wherein the time codes of the video frames in the incoming video stream are time codes included in the incoming video stream, and the on-line MPEG video encoder extracts the time codes from the incoming video stream.

16. The method as claimed in claim 14, wherein the time codes of the video frames in the incoming video stream are longitudinal time codes, the on-line MPEG video encoder obtains the video stream from a video stream input, and the on-line MPEG video encoder obtains the longitudinal time codes from a longitudinal time code input.

17. The method as claimed in claim 14, which includes the on-line MPEG video encoder terminating the terminated GOP with a B or P frame to produce a splice Out-point.

18. The method as claimed in claim 14, which includes the on-line MPEG video encoder producing an open GOP immediately following the new closed GOP.

19. The method as claimed in claim 14, which further includes the on-line MPBG video encoder searching for video frames in the incoming video that have time codes for specified splice points in order to encode a closed GOP having an initial I frame in the MPBG Transport Stream for each of the specified splice points.

20. A method of operating an on-line MPEG-2 video encoder and a video server, the on-line MPEG-2 video encoder encoding in real time an incoming video stream to produce an MPBG-2 Transport Stream, the video server receiving the MPEG-2 Transport Stream and recording a segment of the MPEG-2 Transport Stream as a clip, the incoming video stream including video frames, the video frames having respective time codes, said method comprising:

a controller receiving from an operator a specification for the video frames to be included in the clip;

the controller establishing a data link with the on-line MPEG-2 video encoder and with the video server, and transmitting to the encoder and the video server the specification for the video frames to be included in the clip;

the on-line MPEG-2 video encoder comparing the time codes of video frames in the incoming video stream to a time code specification for a first video frame to be included in the clip in order to locate, in the incoming video stream, a first video frame to be included in the clip, and the on-line MPEG-2 video encoder starting a new closed group of pictures (GOP) in the MPEG-2 Transport Stream, the new closed GOP including the first video frame to be included in the clip as a first I frame of the new closed GOP, the on-line MPEG-2 video encoder inserting at least the time code for the first video frame to be included in the clip into a GOP header for the new closed GOP in the MPEG-2 transport stream, and the on-line MPEG-2 video encoder terminating a GOP in the MPEG-2 Transport Stream to produce a terminated GOP encoding a last video frame to be encoded in the clip as the last video frame in the terminated GOP; and the video server searching the MPEG-2 Transport Stream for the video frame having the time code for the first video frame to be included in the clip to locate the first video frame to be included in the clip, and the video server recording the clip in storage of the video server.

21. The method as claimed in claim 20, wherein the time codes of the video frames in the incoming video stream are time codes included in the incoming video stream, and the on-line MPEG video encoder extracts the time codes from the incoming video stream.

22. The method as claimed in claim 20, wherein the time codes of the video frames in the incoming video stream are longitudinal time codes, the on-line MPEG video encoder obtains the video stream from a video stream input, and the on-line MPEG video encoder obtains the longitudinal time codes from a longitudinal time code input.

23. The method as claimed in claim 20, which includes the on-line MPEG-2 video encoder terminating the terminated GOP with a B or P frame to produce a splice Out-point.

24. The method as claimed in claim 20, which includes the on-line MPEG-2 video encoder producing an open GOP immediately following the new closed GOP.

25. The method as claimed in claim 20, which further includes the on-line MPEG-2 video encoder receiving from the controller a list of time codes for splice points in the clip, and the on-line MPEG-2 video encoder searching for video frames in the incoming video stream that have the time codes for the splice points in order to encode a closed GOP having an initial I frame in the MPEG-2 Transport Stream for each of the splice points.

26. The method as claimed in claim 20, wherein the controller sends remote procedure calls to the on-line MPEG-2 video encoder in order to supervise the encoding process performed by the on-line MPEG-2 video encoder.

27. An on-line MPEG video encoder for real-time encoding of an incoming video stream to produce an MPEG Transport Stream, the incoming video stream having video frames, the video frames having respective time codes, the on-line MPEG video encoder having a data link input for receiving remote control commands including time code specifications from an external controller, the on-line MPEG video encoder being programmed for comparing the time codes of video frames in a first portion of the incoming video stream to a first time code specification to locate, in the incoming video stream, a first video frame having a time code specified by the first time code specification, and to start a new closed group of pictures (GOP) in the MPEG Transport Stream including the first video frame encoded as a first I frame of the new closed GOP, and the on-line MPEG video encoder being programmed to compare the time codes of video frames in a second portion of the incoming video stream to a second time code specification to identify, in the incoming video stream, a second video frame having a time code specified by the second time code specification, and to terminate a GOP in the MPEG transport stream to produce a terminated GOP, the terminated GOP having a last video frame immediately preceding the second video frame.

28. The on-line MPEG video encoder as claimed in claim 27, wherein the time codes of the video frames in the incoming video stream are time codes included in the incoming video stream, and the on-line MPEG video encoder is programmed to extract the time codes from the incoming video stream.

29. The on-line MPEG video encoder as claimed in claim 27, wherein the time codes of the video frames in the incoming video stream are longitudinal time codes, the on-line MPEG video encoder has a video stream input for input of the incoming video stream, and the on-line MPEG video encoder has a longitudinal time code input for input of the longitudinal time codes of the video frames in the incoming video stream.

30. The on-line MPEG video encoder as claimed in claim 27, wherein the on-line MPEG video encoder is further programmed to insert the time code for the first video frame in a header of the new closed GOP in the MPEG Transport Stream, and to insert the time code for the second video frame in a header for a GOP in the MPEG Transport Stream immediately following the terminated GOP.

31. The on-line MPEG video encoder as claimed in claim 27, wherein the on-line MPEG video encoder is programmed to terminate the terminated GOP with a B or P frame to produce a splice Out-point.

32. The on-line MPEG video encoder as claimed in claim 27, wherein the on-line MPEG video encoder is programmed to produce an open GOP immediately following the new closed GOP.

33. The on-line MPEG video encoder as claimed in claim 27, wherein the on-line MPEG video encoder is programmed for receiving from the data link a list of time code specifications for splice points between the first video frame and the second video frame, and searching for video frames in the incoming video that have the time codes specified for the splice points in order to encode closed GOPs having initial I frames in the MPEG Transport Stream for the splice points.

34. An on-line MPEG video encoder for real-time encoding of an incoming video stream to produce an MPEG Transport Stream, the incoming video stream having video frames, the video frames having respective time codes,
the on-line MPEG video encoder having a data link input for receiving remote control commands including time code specifications from an external controller,
the on-line MPEG video encoder being programmed for comparing time codes of video frames in the incoming video stream to a list of time code specifications for splice points, and upon finding a video frame in the incoming video stream having a time code specified by a time code specification for a splice point in the list, for starting a new closed group of pictures (GOP) in the MPEG Transport Stream, the new closed GOP including a video frame having the time code specified by the specification for the splice point in the list, and the video frame having the time code specified by the specification for the splice point in the list being encoded as a first I frame of the new closed GOP.

35. The on-line MPEG video encoder as claimed in claim 34, wherein the time codes of the video frames in the incoming video stream are time codes included in the incoming video stream, and the on-line MPEG video encoder is programmed to extract the time codes from the incoming video stream.

36. The on-line MPEG video encoder as claimed in claim 34, wherein the time codes of the video frames in the incoming video stream are longitudinal time codes, the on-line MPEG video encoder has a video stream input for input of the incoming video stream, and the on-line MPEG video encoder has a longitudinal time code input for input of the longitudinal time codes of the video frames in the incoming video stream.

37. The on-line MPEG video encoder as claimed in claim 34, wherein the on-line MPEG video encoder is further programmed for inserting the time code specified by the specification for the splice point in the list into a header for the new closed GOP in the MPEG Transport Stream.

38. The on-line MPEG video encoder as claimed in claim 34, wherein the new GOP is immediately preceded by a terminated GOP, and wherein the on-line MPEG video encoder is programmed for terminating the terminated GOP with a B or P frame to produce a splice Out-point.

39. A video encoding and recording system comprising:
an on-line MPEG video encoder for encoding in real time an incoming video stream to produce an MPEG Transport Stream, the incoming video stream including video frames, the video frames having respective time codes; and
a video server coupled to the on-line MPEG video encoder for receiving the MPEG Transport Stream and recording a segment of the MPEG Transport Stream as a clip;
wherein the on-line MPEG video encoder is programmed for comparing the time codes of video frames in a first portion of the incoming video stream to a time code specification for a first video frame to be included in the clip in order to locate, in the incoming video stream, a first video frame to be included in the clip, and for starting a new closed group of pictures (GOP) in the MPEG Transport Stream, the new closed GOP including the first video frame to be included in the clip as a first I frame of the new closed GOP, and
wherein the on-line MPEG video encoder is programmed for comparing the time codes of video frames in a second portion of the incoming video stream to a time code specification for a last video frame to be included in the clip in order to locate, in the incoming video stream, the last video frame to be included in the clip, and for terminating a GOP in the MPEG transport stream to produce a terminated GOP encoding the last video frame to be included in the clip as the last video frame in the terminated GOP; and
wherein the on-line MPEG video encoder is programmed for inserting, in a GOP header for each GOP in the transport stream, a time code of at least the first video frame to be displayed from the GOP; and
the video server is programmed for searching the time codes in the GOP headers in the MPEG Transport Stream to locate the first video frame to be included in the clip and to record the clip in storage of the video server.

40. The system as claimed in claim 39, wherein the time codes of the video frames in the incoming video stream are time codes included in the incoming video stream, and the on-line MPEG video encoder is programmed to extract the time codes from the incoming video stream.

41. The system as claimed in claim 39, wherein the time codes of the video frames in the incoming video stream are longitudinal time codes, the on-line MPEG video encoder has a video stream input for input of the incoming video stream, and the on-line MPEG video encoder has a longitudinal time code input for input of the longitudinal time codes of the video frames in the incoming video stream.

42. The system as claimed in claim 39, wherein the on-line MPEG video encoder is programmed for terminating the terminated GOP with a B or P frame to produce a splice Out-point.

43. The system as claimed in claim 39, wherein the on-line MPEG video encoder is programmed for producing an open GOP immediately following the new closed GOP.

44. The system as claimed in claim 39, wherein the on-line MPEG video encoder is programmed for searching for video frames in the incoming video that have time codes for specified splice points in order to encode a closed GOP having an initial I frame in the MPEG Transport Stream for each of the specified splice points.

45. A video encoding and recording system comprising:

an on-line MPEG-2 video encoder for encoding in real time an incoming video stream to produce an MPEG-2 Transport Stream, the incoming video stream including video frames, the video frames having respective time codes; and a video server coupled to the on-line MPEG-2 video encoder for receiving the MPEG Transport Stream and recording a segment of the MPEG Transport Stream as a clip; and a controller for receiving from an operator a specification for the video frames to be included in the clip and coupled by at least one data link to the on-line MPEG-2 video encoder and the video server for transmitting to the on-line MPEG-2 video encoder and to the video server the specification for the video frames to be included in the clip;

wherein the on-line MPEG-2 video encoder is programmed for comparing time codes of video frames in the incoming video stream to a time code specification for a first video frame to be included in the clip in order to locate, in the incoming video stream, a first video frame to be included in the clip, and for starting a new closed group of pictures (GOP) in the MPEG-2 Transport Stream, the new closed GOP including the first video frame to be included in the clip as a first I frame of the new closed GOP, and the on-line MPEG-2 video encoder is programmed for inserting at least the time code for the first video frame to be included in the clip into a GOP header for the new closed GOP in the MPEG-2 transport stream, and the on-line MPEG-2 video encoder is further programmed for terminating a GOP in the MPEG-2 Transport Stream to produce a terminated GOP encoding a last video frame to be encoded in the clip as the last video frame in the terminated GOP; and wherein the video server is programmed for searching the MPEG-2 Transport Stream for the time code for the first video frame to be included in the clip to locate the first video frame to be included in the clip, and for recording the clip in storage of the video server.

46. The system as claimed in claim 45, wherein the time codes of the video frames in the incoming video stream are time codes included in the incoming video stream, and the on-line MPEG-2 video encoder is programmed to extract the time codes from the incoming video stream.

47. The system as claimed in claim 45, wherein the time codes of the video frames in the incoming video stream are longitudinal time codes, the on-line MPEG-2 video encoder has a video stream input for input of the incoming video stream, and the on-line MPEG-2 video encoder has a longitudinal time code input for input of the longitudinal time codes of the video frames in the incoming video stream.

48. The system as claimed in claim 45, wherein the on-line MPEG-2 video encoder is programmed for terminating the terminated GOP with a B or P frame to produce a splice Out-point.

49. The system as claimed in claim 45, wherein the on-line MPEG-2 video encoder is programmed for producing an open GOP immediately following the new closed GOP.

50. The system as claimed in claim 45, wherein the on-line MPEG-2 video encoder is programmed for receiving from the controller a list of time codes for splice points in the clip, and for searching for video frames in the incoming video stream that have the time codes for the splice points in order to encode a closed GOP having an initial I frame in the MPEG-2 Transport Stream for each of the splice points.

51. The system as claimed in claim 45, wherein the controller sends remote procedure calls to the on-line MPEG-2 video encoder in order to supervise the encoding process performed by the on-line MPEG-2 video encoder.

* * * * *

UNITED STATES PATENT AND TRADEMARK OFFICE
CERTIFICATE OF CORRECTION

PATENT NO. : 6,907,081 B2
DATED : June 14, 2005
INVENTOR(S) : Raymond Mantchala et al.

It is certified that error appears in the above-identified patent and that said Letters Patent is hereby corrected as shown below:

Column 27,
Lines 25, 28 and 33, "MPBG" is changed to -- MPEG --.

Signed and Sealed this

Thirtieth Day of August, 2005

JON W. DUDAS
*Director of the United States Patent and Trademark Office*